(12) United States Patent
Ogiwara

(10) Patent No.: US 10,606,473 B2
(45) Date of Patent: Mar. 31, 2020

(54) DISPLAY METHOD, DISPLAY DEVICE, AND PROGRAM

(71) Applicant: NEC Display Solutions, Ltd., Tokyo (JP)

(72) Inventor: Yusuke Ogiwara, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/753,936

(22) PCT Filed: Nov. 24, 2015

(86) PCT No.: PCT/JP2015/082878
§ 371 (c)(1),
(2) Date: Feb. 20, 2018

(87) PCT Pub. No.: WO2017/090081
PCT Pub. Date: Jun. 1, 2017

(65) Prior Publication Data
US 2018/0239528 A1    Aug. 23, 2018

(51) Int. Cl.
*G06F 3/0488* (2013.01)
*G06T 11/00* (2006.01)
*G09G 5/00* (2006.01)
*G06F 3/0481* (2013.01)
*G06F 3/14* (2006.01)

(52) U.S. Cl.
CPC ...... *G06F 3/04883* (2013.01); *G06F 3/04812* (2013.01); *G06T 11/001* (2013.01); *G09G 5/00* (2013.01); *G06F 3/14* (2013.01)

(58) Field of Classification Search
CPC ....... G06F 3/0416; G06F 3/041; G06F 3/0488

USPC ......................................... 345/173, 618, 589
See application file for complete search history.

(56) References Cited

U.S. PATENT DOCUMENTS

| | | | |
|---|---|---|---|
| 2010/0245384 A1* | 9/2010 | Mase | G06F 3/0414 345/618 |
| 2012/0299964 A1* | 11/2012 | Homma | G06F 1/1694 345/649 |
| 2013/0136315 A1* | 5/2013 | Kawamoto | G06K 9/00442 382/112 |

FOREIGN PATENT DOCUMENTS

| | | |
|---|---|---|
| JP | 2010-129026 A | 6/2010 |
| JP | 2010-205012 A | 9/2010 |
| JP | 2010-237599 A | 10/2010 |
| JP | 2011-044094 A | 3/2011 |
| JP | 2011-065362 A | 3/2011 |
| JP | 2011065362 A * | 3/2011 |
| JP | 2011-158970 A | 8/2011 |
| JP | 2011158970 A * | 8/2011 |
| JP | 2013-019932 A | 1/2013 |

(Continued)

OTHER PUBLICATIONS

International Search Report (ISR) (PCT Form PCT/ISA/210), in PCT/JP2015/082878, dated Feb. 23, 2016.

(Continued)

*Primary Examiner* — Diane M Wills
(74) *Attorney, Agent, or Firm* — McGinn I.P. Law Group, PLLC.

(57) ABSTRACT

A display method of the present invention includes a stain detecting step for detecting a stain on an input display part, and a stained-point displaying step for displaying a predetermined indication at a first point of the input display part corresponding to the position of the detected stain.

20 Claims, 25 Drawing Sheets

(56) References Cited

FOREIGN PATENT DOCUMENTS

JP  2013019932 A  *  1/2013
WO  WO 2015/012128 A1  1/2015

OTHER PUBLICATIONS

Japanese Notice of allowance, dated Sep. 3, 2019, in Japanese Application No. 2017-552555 and English Translation thereof.

* cited by examiner

FIG. 17

| T Level | 0 | NO ERRONEOUS OPERATION |
| --- | --- | --- |
|  | 1 | ERRONEOUS OPERATION FOUND |
|  | 2 | ERRONEOUS OPERATION AFTER WIPING OPERATION FOUND |
| S Level | 0 | NO STAIN |
|  | 1 | STAIN FOUND |
|  | 2 | STAIN FOUND AFTER WIPING OPERATION |
| RELATIONSHIP OF MAGNITUDE |  | $S0=T0<S1<S2<T1<T2$ |

DISPLAY METHOD, DISPLAY DEVICE, AND PROGRAM

TECHNICAL FIELD

The present invention relates to a display method, a display device, and a program.

BACKGROUND ART

Interactive display devices have been produced by integrally combining operation surfaces using touch panels and video-display surfaces (hereinafter, referred to as display screens). Users may operate buttons and figures displayed on display screens. At this time, display devices suffer from problems due to blots or blemishes formed on display screens, which may reduce the accuracy of recognizing user's operations or visibility for users.

Patent Literature 1 discloses a display device for improving a reduction of visibility due to blots. The display device disclosed in Patent Literature 1 counts the number of times each user touches the display screen for each pixel. In addition, it determines a degree of fouling for each pixel based on the number of times each user touches the display screen. Therefore, it determines a display manner based on the degree of fouling determined above.

CITATION LIST

Patent Literature Document

Patent Literature 1: Japanese Patent Application Publication No. 2010-237599

SUMMARY OF INVENTION

Technical Problem

The display device disclosed in Patent Literature 1 improves a reduction of visibility by determining the display manner depending on the degree of fouling. However, Patent Literature 1 does not refer to a reduction of operability due to blots or blemishes.

When a user operates a display device, integrally combining an operation surface and a video-display surface, at positions of blots or blemishes attached to the display screen, it may cause a problem that the user cannot get an original sensation of operating the display device.

The present invention is made in consideration of the aforementioned circumstances, and therefore the present invention aims to provide a display method, a display device, and a program which can solve the above problem.

Solution to Problem

To solve the above problem, one aspect of the present invention is directed to a display method including a stain detecting step for detecting a stain on an input display part, and a stained-point displaying step for displaying a predetermined indication at a first point of the input display part corresponding to the position of the detected stain.

Another aspect of the present invention is directed to a display device comprising a processor for detecting a stain on an input display part and for displaying a predetermined indication at a first point of the input display part corresponding to a position of a detected stain.

A further aspect of the present invention is directed to a display device controlled by a processor configured to detect a stain on an input display part and to thereby display a predetermined indication at a first point of the input display part corresponding to the position of the detected stain.

A further aspect of the present invention is directed to a program causing a computer to implement a stain detecting step for detecting a stain on an input display part, and a stained-point displaying step for displaying a predetermined indication at a first point of the input display part corresponding to the position of the detected stain.

Advantageous Effects of Invention

According to the present invention, it is possible to improve an operating sensation by preventing an unexpected reduction of operability.

BRIEF DESCRIPTION OF DRAWINGS

FIG. 17 is an explanatory drawing for explaining an example of the operation of the display device 1a (third embodiment) shown in FIG. 9.

DESCRIPTION OF EMBODIMENTS

First Embodiment

Figure 1:
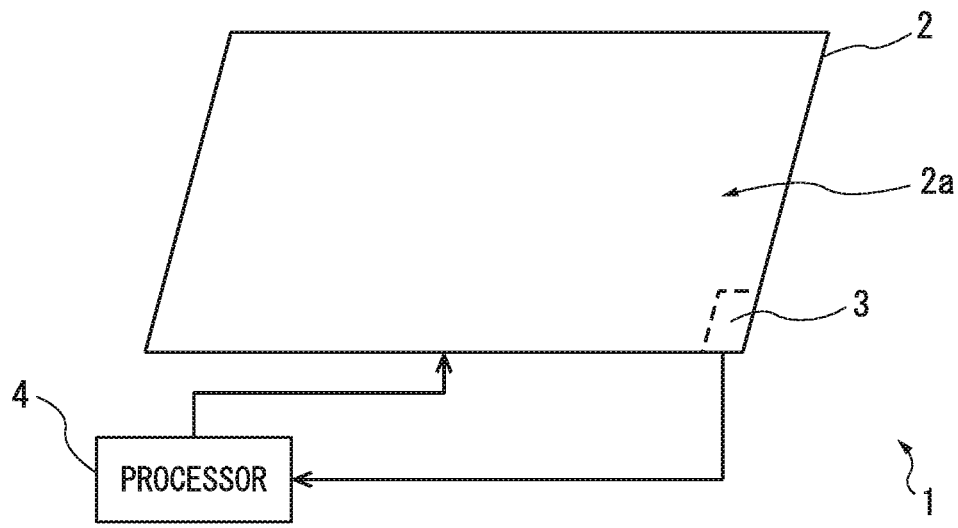
FIG. 1 is a system diagram showing an example of the configuration of the first embodiment of the present invention.

Hereinafter, the first embodiment of the present invention will be described with reference to the drawings. FIG. 1 is a system diagram showing the configuration of the first embodiment. The display device 1 shown in FIG. 1 includes a display 2, a detector 3, and a processor 4.

The display 2 having a display screen 2a displays an image on the display screen 2a according to a control signal output from the processor 4. For example, the display 2 is a touch-panel display integrally combining an operation surface using a touch panel and a video-display surface. In this case, the display 2 is integrally combined with the detector 3. In this connection, the display 2 is not necessarily integrally combined with the detector 3. For example, the display 2 may be configured of a projector while the detector 3 may be configured of a camera.

Figure 2:
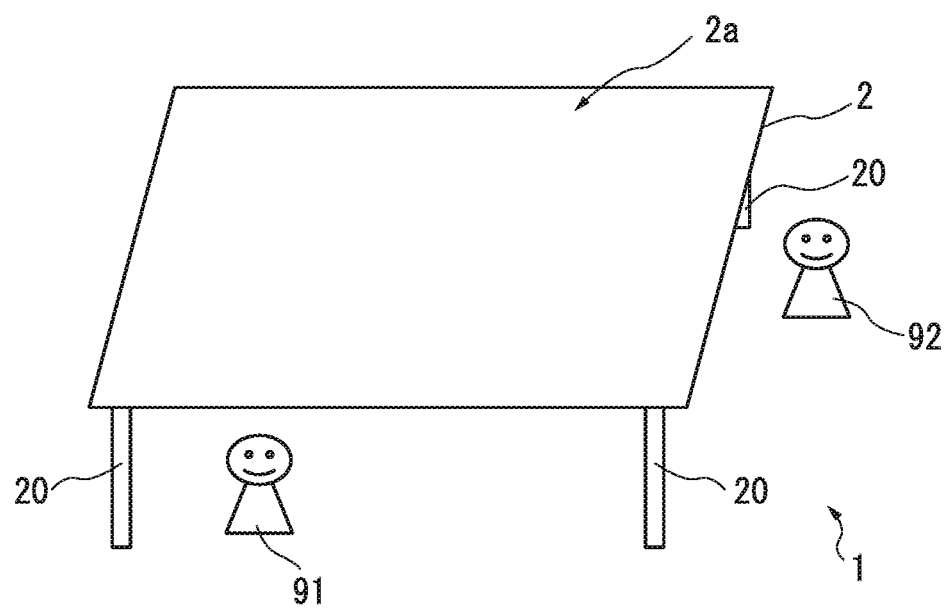
FIG. 2 is an explanatory drawing for explaining an example of the configuration of a display device 1 shown in FIG. 1.

For example, the display 2 may be configured of a touch-panel guide plate, a table-type display device shared by communities of users, or a display of a mobile terminal such as a smartphone. FIG. 2 shows an example of the configuration in which the display 2 is configured of a touch-panel table-type display. The display 2 shown in FIG. 2 forms a flat table board, which is supported by multiple legs 20, using the display screen 2a. Thus, it is possible for each of users 91 and 92 to carry out an input operation at an arbitrary position on the display screen 2a.

The detector 3 detects an input operation made by each user on the display screen 2a of the display 2. The detector 3 sends the information representing the nature of the detected operation to the processor 4. The detector 3 detects input operations on the display screen 2a of the display 2 by measuring resistance, capacitance, sound waves, pressure, image recognition results, light, magnetism via styluses, and other variations of quantity such as ON/OFF of switches. The detector 3 may combine multiple measures. For example, the detector 3 periodically detect the presence/absence of an input operation for each pixel or each unit of pixels on the display screen 2a. The detector 3 periodically sends the information representing the nature of operations, e.g. the results of detecting the presence/absence of input operations for all units or for part of units, to the processor 4. Alternatively, the detector 3 may send the information representing the nature of operations, e.g. the position of a part detecting an input operation or the position and its detected value, to the processor 4. In addition, the detector 3 may send the information representing the nature of operations, e.g. the information representing the manner of an input operation which is detected by recognizing variations of measurement results over time, to the processor 4. For example, the manner of an input operation can be identified using the information representing the type of operation, the position and the range, the operating time, or the like.

For example, the processor 4 is configured of a CPU (Central Processing Unit) and a memory device, and therefore it carries out operations with the CPU executing predetermined programs. In the present embodiment, the processor 4 detects stains on the display screen 2a of the display 2 in response to an output signal of the detector 3, thus displaying a predetermined marking at a location covering stains detected on the display screen 2a of the display 2. When a user does not operate the display screen 2a of the display 2, the processor 4 detects stains based on the detecting condition of the detector 3. When the detector 3 detects the same condition as the condition depicting an input operation under the condition depicting no user's operation, the processor 4 determines that the location of detecting an input operation is stained. The following description refers to the detecting condition of the detector 3 detecting an input operation as the reacting condition of the detector 3 reacting to an input operation. Herein, the condition depicting no user's operation refers to (1) a specified time (i.e. a specific time or a time zone) such as working hours or midnight hours when no manager anticipates anybody operating the display device 1, and (2) a time when it is determined that nobody is found around the display device 1 by use of a human sensor, a camera, or the like. Alternatively, the condition depicting no user's operation may refer to (3) the condition before turning off the screen of the display device 1, e.g. a smartphone, with the display screen 2a being turned upwardly.

Figure 3:
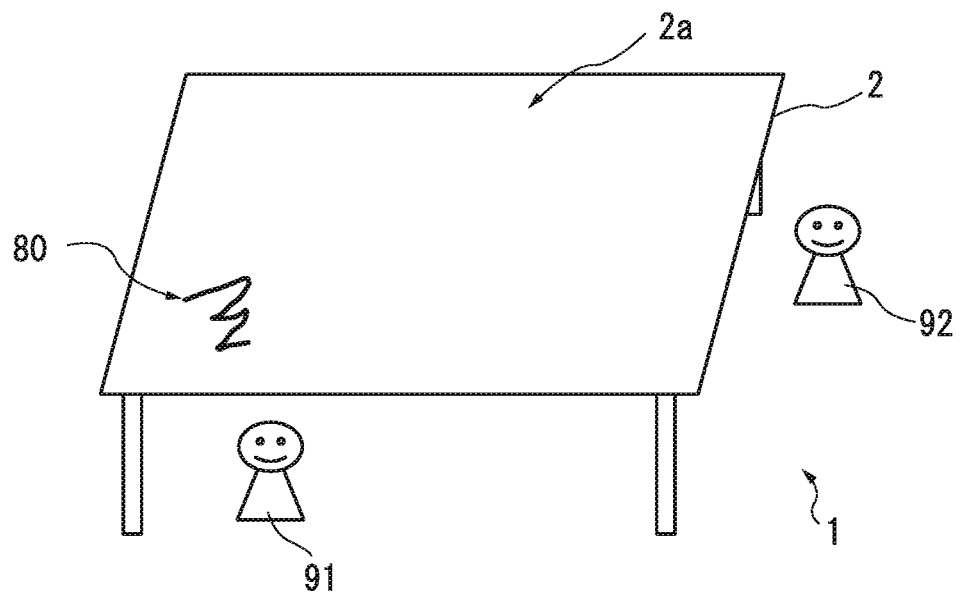
FIG. 3 is an explanatory drawing for explaining an example of the operation of the display device 1 shown in FIG. 1.
Figure 4:
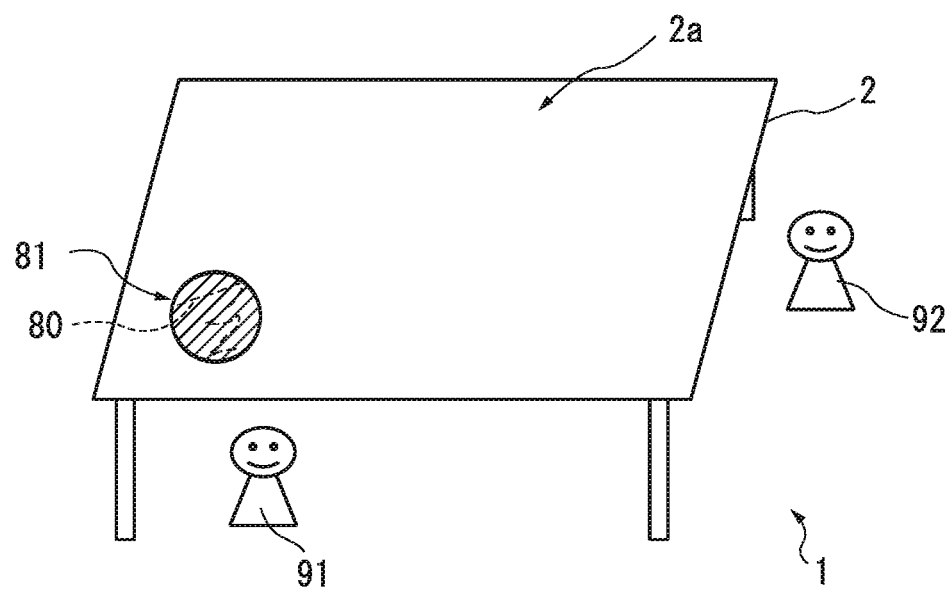
FIG. 4 is an explanatory drawing for explaining an example of the operation of the display device 1 shown in FIG. 1.
Figure 30:
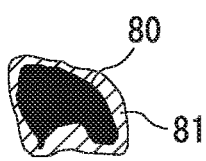
FIG. 30 is an explanatory drawing for explaining the embodiments of the present invention.
Figure 31:
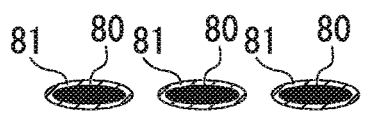
FIG. 31 is an explanatory drawing for explaining the embodiments of the present invention.
Figure 32:
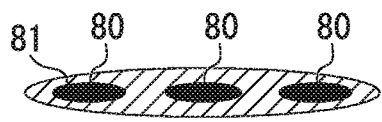
FIG. 32 is an explanatory drawing for explaining the embodiments of the present invention.
Figure 33:
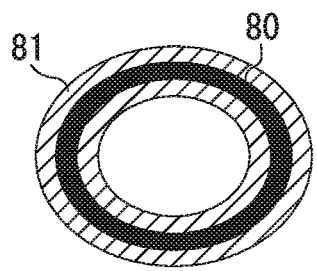
FIG. 33 is an explanatory drawing for explaining the embodiments of the present invention.
Figure 34:
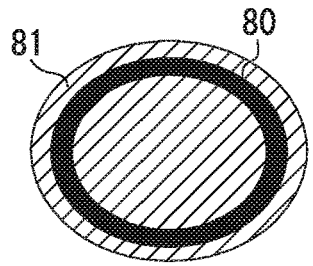
FIG. 34 is an explanatory drawing for explaining the embodiments of the present invention.

Stains may refer to blots and/or blemishes. That is, stains may refer to blots without blemishes, blemishes without blots, or both of blots and blemishes. As shown in FIG. 3, for example, the processor 4 detects a stain 80 formed on the display screen 2a of the display 2 in response to an output signal of the detector 3. Then, as shown in FIG. 4, for example, the processor 4 displays a predetermined marking 81 at the location covering the stain 80 detected on the display screen 2*a* of the display 2. The marking 81 is a pattern used to visualize the location indicating the stain 80, which is hardly seen by each user or which cannot be seen by each user. Basically, the marking 81 is displayed to fringe the circumference of the location of the stain 80 (see FIGS. 30, 31, and 33). When multiple stains 80 are formed closely in a sufficiently short distance as shown in FIG. 32, it is possible to display a single marking 81 concatenating those stains 80. As shown in FIG. 34, it is possible to fill up the center of a doughnut. These markings can be freely set upon implementing systems.

In each drawing, the same or corresponding parts as the foregoing parts shown in other drawings are denoted using the same reference signs; hence, their descriptions will be omitted here accordingly.

Next, an example of the operation of the display device 1 shown in FIG. 1 will be described with reference to the flowchart shown in FIG. 5. For example, it is possible to start the process according to the flowchart of FIG. 5 at any timing such as a timing of applying power to the device, a timing of rebooting the device, a timing of restoring the device after sleeping (or a timing of carrying out a predetermined operation), a timing of reaching a preset time (or a timing of reaching a predetermined time), a lapse of a preset time (or a lapse of a predetermined time), or the like. Upon starting the process shown in FIG. 5, the processor 4 firstly determines whether or not a user carries out an input operation (step S10). When the user carries out an input operation (i.e. YES in step S10), the processor 4 repeats the decision of step S10 (i.e. repetition of YES in step S10). In step S10, for example, the processor 4 captures an image of the periphery of the display screen 2*a* by use of a non-illustrated camera and thereby determines whether or not a user operates the display screen 2*a* based on the captured image.

Upon determining that a user does not make an input operation (i.e. NO in step S10), the processor 4 checks the reaction of the detector (step S11). In step S11, the processor 4 checks the reaction of the detector 3 for each point on the condition that the detector 3 reacts at multiple points. Next, the processor 4 determines whether or not the detector 3 triggers a reaction based on the checking result of step S11 (step S12). When the detector 3 triggers no reaction (i.e. NO in step S12), the processor 4 exits the process. When the detector 3 triggers a reaction (i.e. YES in step S12), the processor acquires the position of the point and its range from the detector 3 (step S13). Next, the processor 4 marks the point (step S14). In step S14, the processor 4 stores the information representing stains being formed at each point on any one of storage areas which are prepared in advance with respect to one or multiple pixels on the display screen 2*a*. Next, the processor 4 displays a marking at the marked point on the display 2 (step S15). Next, the processor precludes the marked point from the points to be checked in step S11 (step S16). Next, the processor 4 carries out the process of step S11 again. The processor 4 repeatedly checks whether or not the detector 3 triggers a reaction at other points other than the marked point until no point remains.

Figure 5:
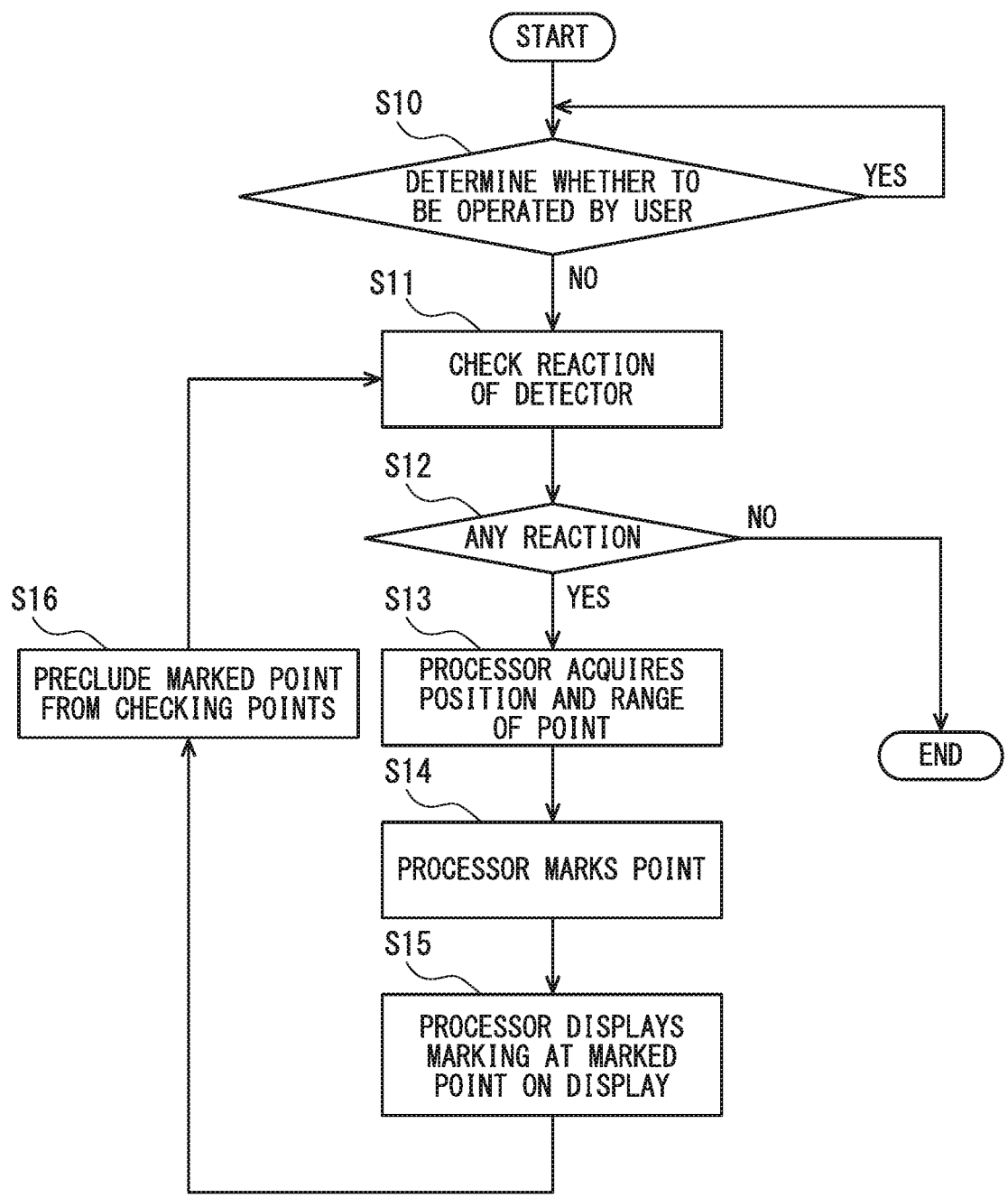
FIG. 5 is a flowchart for explaining an example of the operation of the display device 1 shown in FIG. 1.

According to the flowchart of FIG. 5, it is possible to produce the following effect. For example, the following description refers to the situation in which the stain 80 is attached to a certain point on the display screen 2*a* of the display 2 (FIG. 3). Herein, the stain 80 should be a blot or blemish which is difficult to recognize by each user. In addition, it is assumed that the precision of recognizing a user's operation may be reduced at the point causing the stain 80. In this case, the user may suffer from a problem such that the user cannot get an original sensation of operability at the working point. According to the flowchart of FIG. 5, however, it is possible to display the marking 81 at the point causing the stain 80 as shown in FIG. 4. This makes it possible for the user to sense a reduction of operability at the point. By looking at the marked point, the user is able to carry out his/her work at another point while circumventing the marked point. In addition, the user may remove a slight blot by himself/herself so as to take countermeasures for restoring the point in an available manner. Alternatively, the user may perform an input operation at the marked point on the pre-assumption that a reduction of operability for an input operation occurs at the marked point. As described above, the present embodiment is designed to notify each user of a reduction of operability due to blots or blemishes on the display screen 2*a*. This makes it possible for each user to select countermeasures by himself/herself, for example, the user receiving a notification may wipe out blots at the marked point, or each user may operate the display screen 2*a* while circumventing the marked point.

Figure 6:
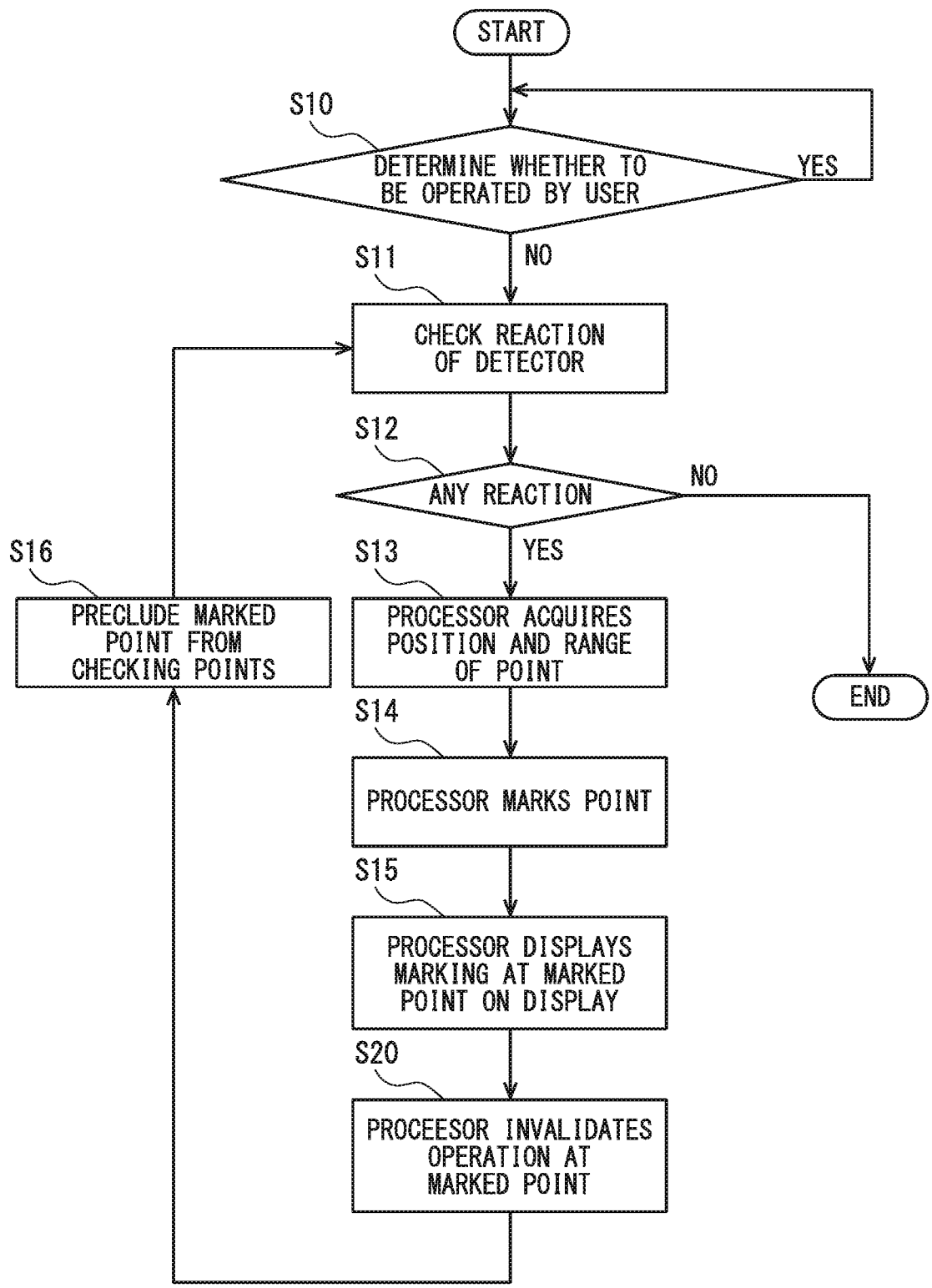
FIG. 6 is a flowchart for explaining an example of the operation of the display device 1 shown in FIG. 1.

Next, another example of the operation of the display device 1 shown in FIG. 1 will be described with reference to FIG. 6. The flowchart shown in FIG. 6 differs from the flowchart shown in FIG. 5 in that it introduces a new step S20 between the steps S15 and S16. In step S20, the processor 4 makes a setting for invalidating an operation at the point marked in step S14. According to the flowchart of FIG. 6, it is possible for the processor 4 to invalidate an input operation at the point after marking in order to prevent erroneous operations even when any operation is detected at the marked point.

Figure 7:
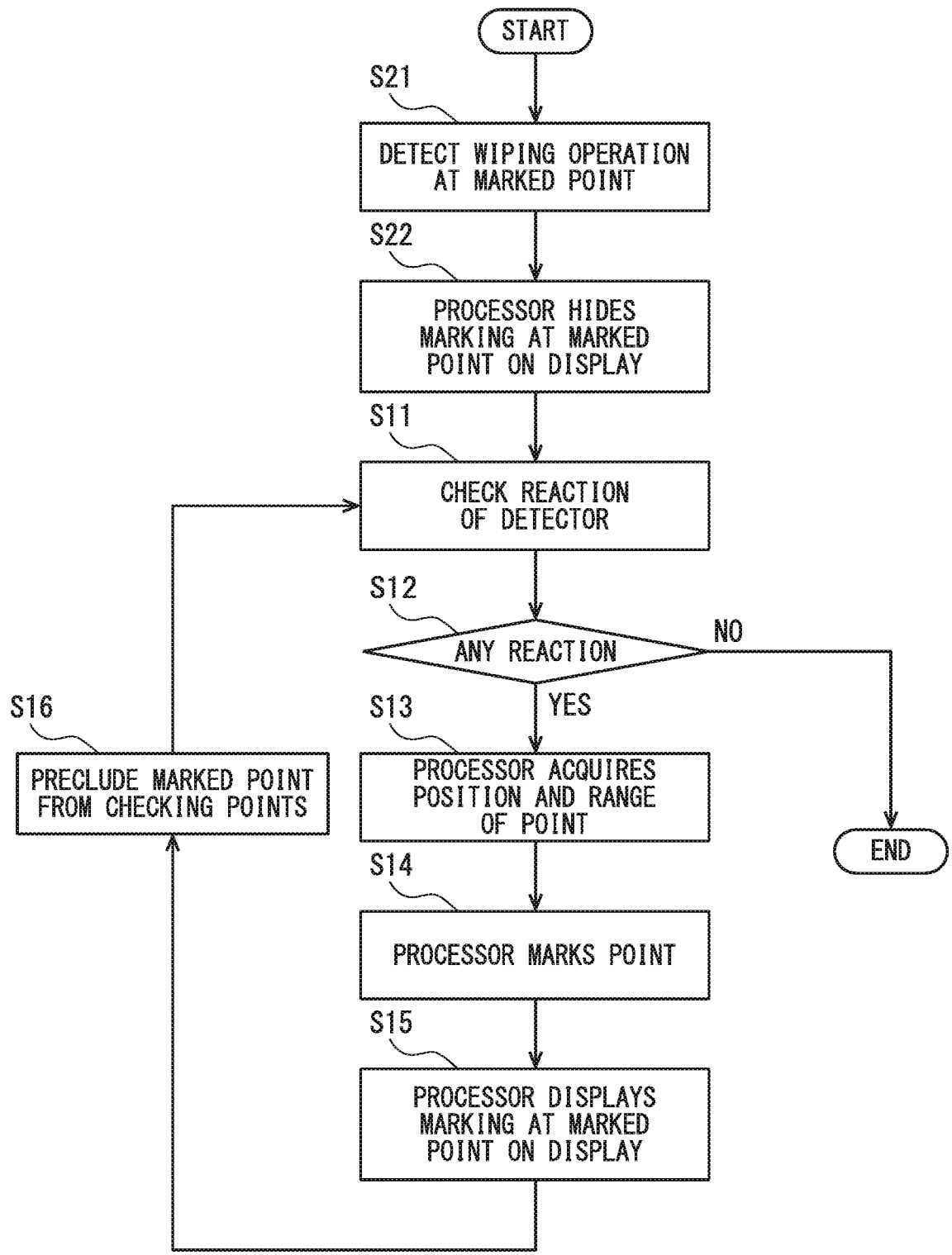
FIG. 7 is a flowchart for explaining an example of the operation of the display device 1 shown in FIG. 1.

Next, a further example of the operation of the display device 1 shown in FIG. 1 will be described with reference to FIG. 7. The flowchart shown in FIG. 7 differs from the flowchart shown in FIG. 5 in that it introduces steps S21 and S22 instead of the step S10. In step S21, the processor 4 carries out a series of steps following step S22 when it detects that a user wipes out any stain at the marked point based on the outcome of the detector 3. In step S22, the processor 4 hides the marking displayed at the marked point at which a wiping operation is detected on the display 2. According to the flowchart of FIG. 7, the processor 4 temporarily hides the marking at the point of marking any stain when the detector 3 detects an operation of wiping out stains at the marked point, and then the processor 4 displays the marking again by checking and obtaining a reaction triggered by the detector 3.

In this connection, it is possible to produce the following methods as to how the processor 4 determines a wiping operation at a point (i.e. a first point) which is marked by an input operation detected by the detector 3. That is, Method (1) allows a user to indicate a wiping operation with the processor 4. For example, a button representing a wiping operation is displayed on the display screen 2*a*, and then a user may touch the button to indicate the wiping operation in advance before carrying out the wiping operation. Method (2) determines a wiping operation based on an input operation on the display 2. For example, it is assumed that a user may touch the display 2 with the entire palm of his/her hand when the user carries out a wiping operation using a towel for a table. For this reason, it is possible to determine a wiping operation when a user touches and moves the entire palm of his/her hand on the display 2. Method (3) users a camera to capture the movement of each user so as to determine a wiping operation based on the captured image or moving image.

In step S22, the processor 4 hides the marking displayed at the marked point at which a wiping operation is detected; but it is not necessary to hide the marking. For example, it is possible to replace a process of hiding the marking with another process of changing a display manner at the stained point by changing the brightness or the color of the marking or by changing both the brightness and the color of the marking.

Figure 8:
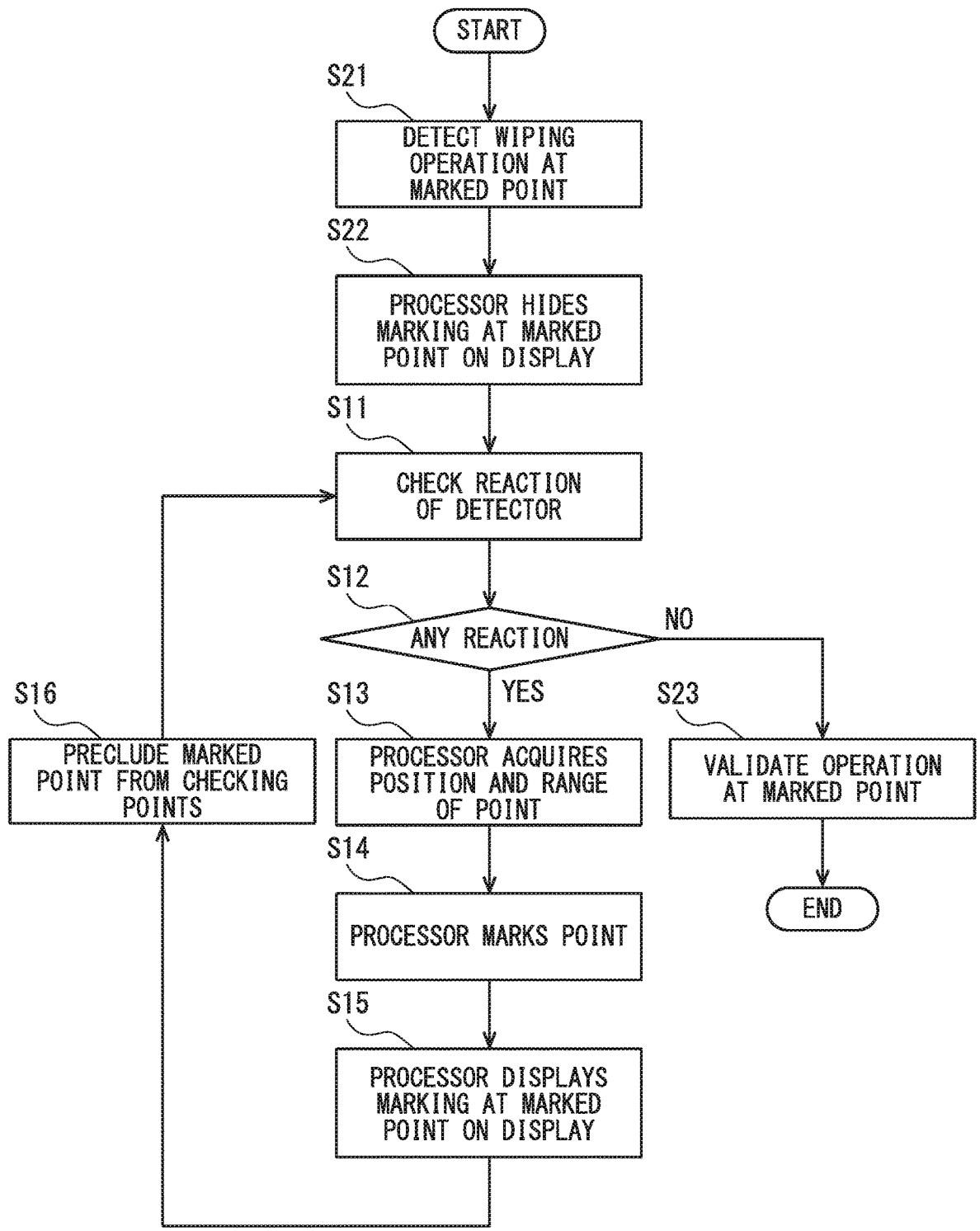
FIG. 8 is a flowchart for explaining an example of the operation of the display device 1 shown in FIG. 1.

A further example of the operation of the display device shown in FIG. 1 will be described with reference to FIG. 8. The flowchart shown in FIG. 8 differs from the flowchart shown in FIG. 7 in that it introduces a new step S23. When the processor 4 determines no reaction being triggered by the detector 3 in step S12 (i.e. NO in step S12), it makes a setting for validating an operation at the marked point (step S23). According to the flowchart shown in FIG. 8, the processor 4 restores and validates an operation when an erroneous reaction disappears on the condition that it suspends the operation at the marked point in order to prevent erroneous recognition.

As described above, the present embodiment is able to improve an operating sensation by preventing an unexpected reduction of operability.

Second Embodiment

Figure 9:
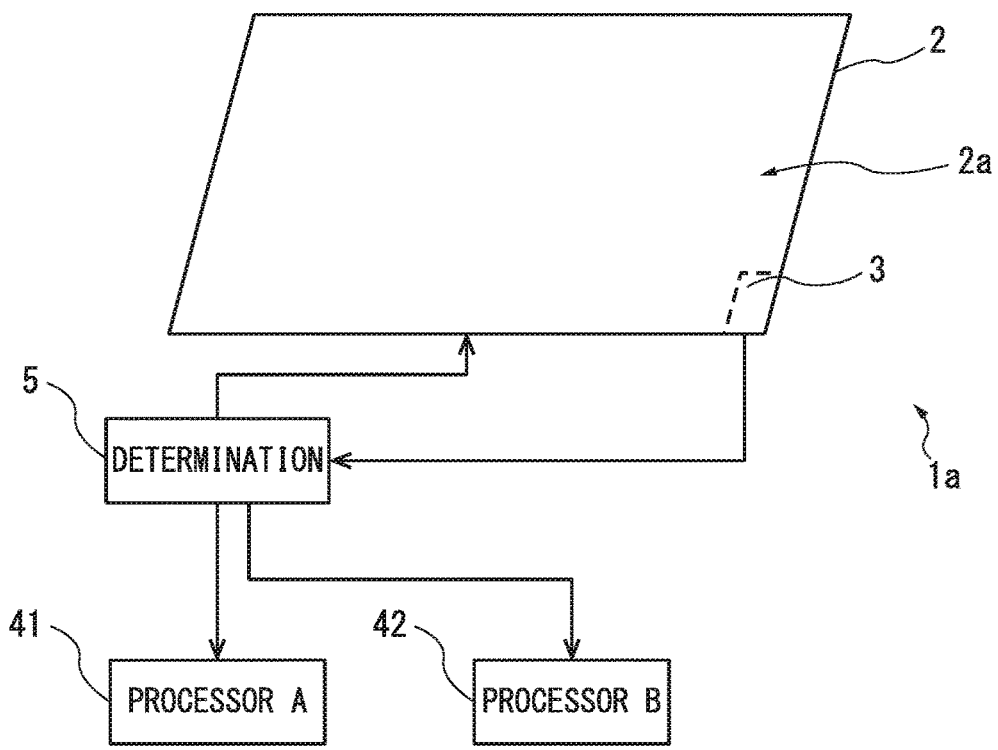
FIG. 9 is a system diagram showing an example of the configuration of the second and third embodiments of the present invention.

Hereinafter, the second embodiment of the present invention will be described with reference to the drawings. FIG. 9 is a system diagram showing the configuration of the second embodiment. A display device 1a shown in FIG. 9 includes the display 2, a determination part 5, a processor A41, and a processor B42. A combination of the determination part 5, the processor A41, and the processor B42 is equivalent to the configuration of the processor 4 of the first embodiment shown in FIG. 1. For example, the determination part 5, the processor A41, and the processor B42 are each configured using the same CPU or different CPUs together with a memory device; hence, their operations are implemented by executing predetermined programs with the CPU(s).

Figure 10:
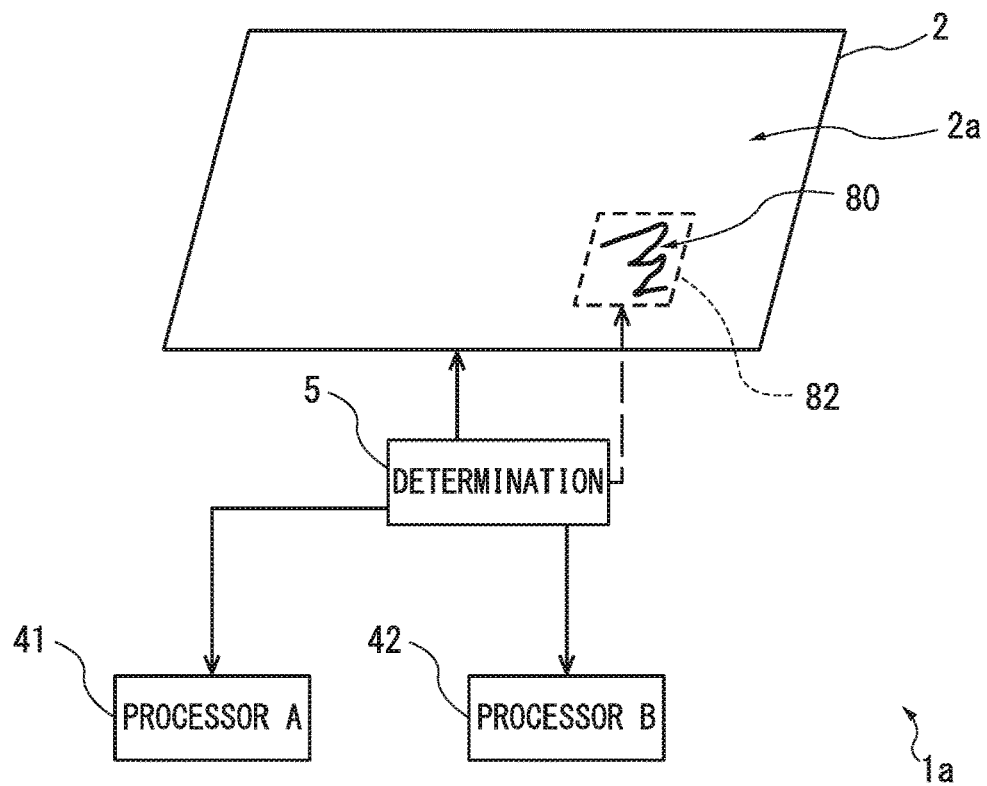
FIG. 10 is an explanatory drawing for explaining an example of the operation of a display device 1a shown in FIG. 9.

In the display device 1a shown in FIG. 9, the determination part 5 allocates operations at a user-operable area to the processor A41 while allocating operations at an area marking blots or blemishes to the processor B42. As shown in FIG. 10, the user-operable area is an operating area other than a marked area 82 covering the stain 80 on the display screen 2a. The processor A41 assumes processes normally conducted by users. The processor B42 assumes processes for monitoring a wiping operation at the stained point. In the initial state before detecting the stain 80, the determination part 5 makes a setting to allocate operations at all areas to the processor A41.

Figure 12:
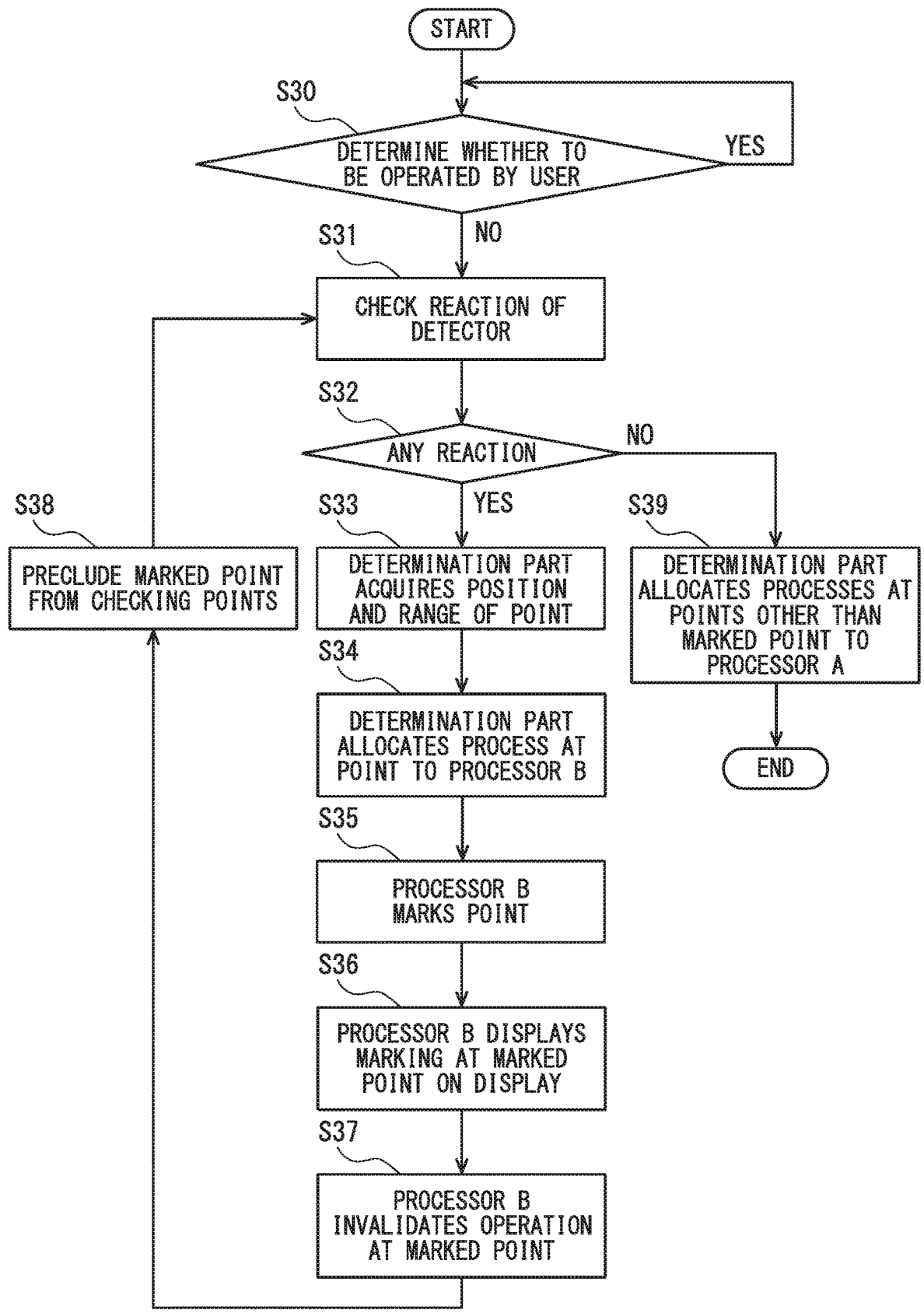
FIG. 12 is a flowchart for explaining an example of the operation of the display device 1a (second embodiment) shown in FIG. 9.

Next, an example of the operation of the display device 1a shown in FIG. 9 will be described with reference to the flowchart shown in FIG. 12. Upon executing a predetermined program, the determination part 5 firstly determined whether or not a user performs an input operation (step S30). When the user performs an input operation (i.e. YES in step S30), the determination part 5 repeatedly carries out the decision of step S30 (i.e. the repetition of YES in step S30). In step S30, for example, the determination part 5 captures an image representing the peripheral of the display screen 2a by use of an unillustrated camera, and then it determines whether or not the user operates the display screen 2a based on the captured image.

Upon determining that the user does not perform an input operation (i.e. NO in step S30), the determination part 5 checks a reaction of the detector 3 (step S31). In step S31, the determination part 5 checks a reaction of the detector 3 for each point when the detector 3 reacts at multiple points. Next, the determination part 5 determines whether or not the detector 3 triggers a reaction based on the checking result of step S31 (step S32). When the detector 3 reacts at a certain point (i.e. YES in step S32), the determination part 5 acquires the position of the point and its range from the detector 3 (step S33).

Next, the determination part 5 makes a setting to allow the process at the point to the processor B42 (step S34). Next, the processor B42 marks the point (step S35). Next, the processor B42 displays a marking at the marked point on the display 2 (step S36). Next, the processor B42 makes a setting to invalidate any operation at the marked point (step S37). Next, the determination part 5 precludes the marked point from the points to be checked in step S31 (step S38). Next, the determination part 5 carries out the process of step S31 again. The determination part 5 repeatedly checks whether the detector 3 reacts at other points other than the marked point until no points remains.

Upon determining that the detector 3 triggers no reaction in step S32 (i.e. NO in step S32), the determination part 5 makes a setting to allocate processes at other points other than the marked point to the processor A41 (step S39). Thus, the determination part 5 exits the process.

Figure 13:
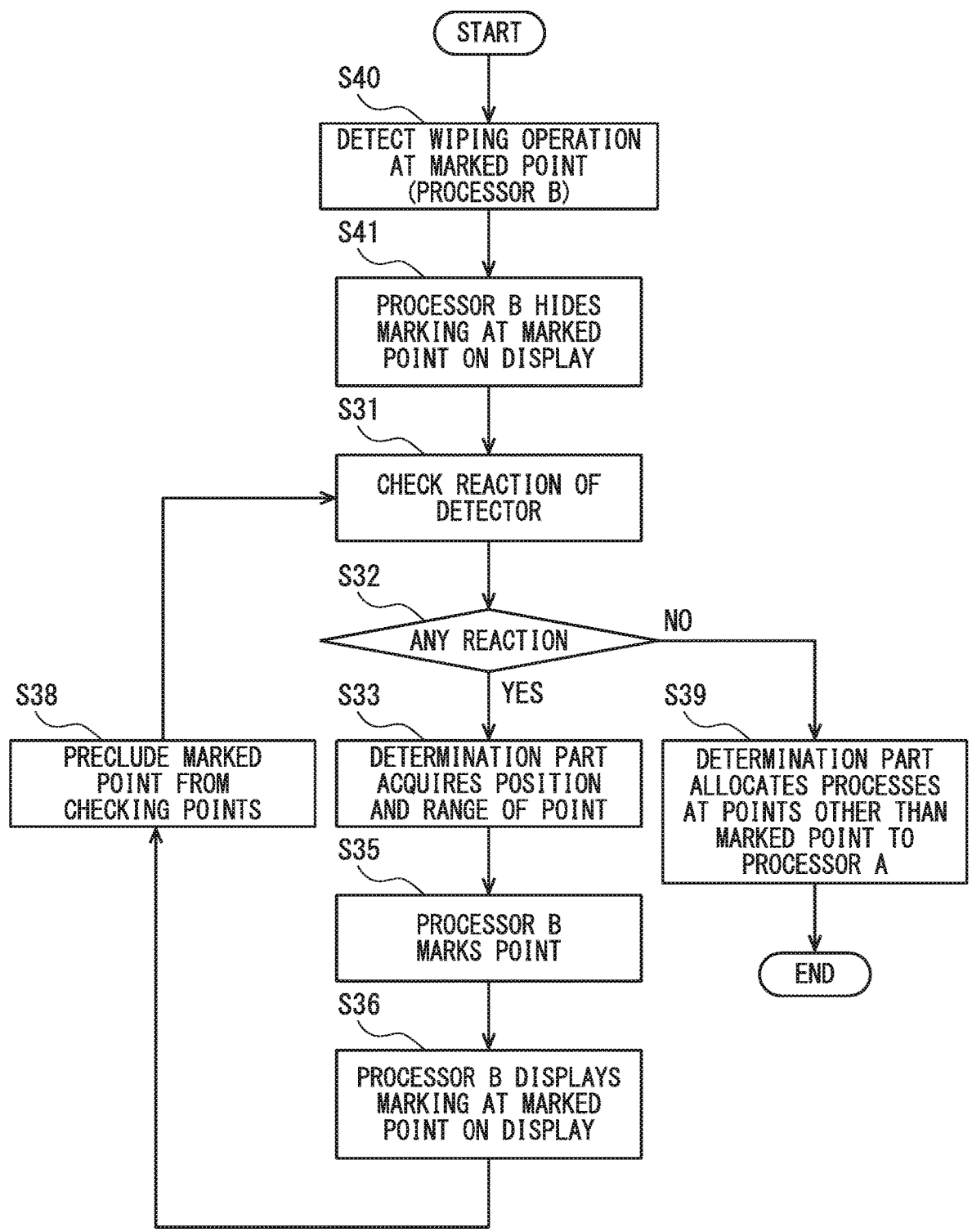
FIG. 13 is a flowchart for explaining an example of the operation of the display device 1a (second embodiment) shown in FIG. 9.

Next, another example of the operation of the display device 1a shown in FIG. 9 will be described with reference to FIG. 13. The flowchart shown in FIG. 13 differs from the flowchart shown in FIG. 12 in that the step S30 is replaced with steps S41 and S41 while the step S37 is deleted. In step S40, the processor B42 carries out a series of processes started with step S41 based on the outcome of the detector 3 upon detecting a wiping operation at the marked point. In step S41, the processor B42 hides the marking displayed at the marked point, at which a wiping operation is detected, on the display 2. According to the flowchart shown in FIG. 13, the processor B42 temporarily hides the marking at the point marking any stains when the detector 3 detects a wiping operation at the marked point. Then, the processor B42 displays the marking again when the determination part 5 checks and determines a reaction of the detector 3.

Next, a further example of the operation of the display device 1a shown in FIG. 9 will be described with reference to the flowchart shown in FIG. 14. This operation is an example of the operation of the display device 1a displaying the marking 81. The flowchart of FIG. 14 differs from the flowchart of FIG. 12 in that it is adapted to the flow suited to a touch sensor serving as the detector 3. It is easy for the detector 3 serving as a touch sensor to collectively check multiple points causing reactions. In this case, the processor B42 acquires the information representing multiple points causing reactions collectively, and then it carries out a process of marking multiple points causing reactions based on the collectively acquired information. In addition, it is possible to collectively transfer the detection results from the detector 3 to the processor B42. Therefore, it is possible to carry out a transfer process efficiently. In this connection, the flowchart of FIG. 12 repeatedly carries out a process of checking each of points causing reactions. According to the flowchart of FIG. 14 described above, it is possible to collectively output the detection results of the detector 3 for all pixels in the entire area or a partial area designated on the display screen 2a. Therefore, when the detector 3 triggers reactions at multiple areas irrespective of no operations made by each user, for example, it is possible to concurrently display the markings 81 at multiple areas.

When a user does not perform an input operation, the processor B42 obtains the detection results of the detector 3 for the entire display area or a partial area (step S50). Next, the determination part 5 checks a reaction of the detector 3 (step S51). In step S51, the determination part 5 checks reactions of the detector 3 at all points when the detector 3 reacts at multiple points. Based on the checking result of step S51, the determination part 5 determines whether or not the detector 3 triggers a reaction (step S52). Upon determining that the detector 3 triggers a reaction at a point (i.e. YES in step S52), the determination part 5 acquires the position of the point and its range (step S53).

Next, the determination part 5 makes a setting to allocate the process at the point to the processor B42 (step S54). Next, the processor B42 displays a marking at the point on the display 2 (step S55). Thus, the determination part 5 exits the process.

Upon determining that the detector 3 does not trigger any reaction (i.e. NO in step S52), the determination part 5 makes a setting to allow the process at the point to the processor A41 (step S56). In step S56, the determination part 5 makes a setting to allow the process at the point, which is previously allocated to the processor B42, to the processor A41. Thus, the determination part 5 exits the process.

Next, a further example of the operation of the display device 1a shown in FIG. 9 will be described with reference to FIG. 15. This operation is an example of the operation adapted to the situation in which a user has wiped out stains on the display device 1a. According to this operation, the processor B42 firstly deletes the marking 81 upon detecting a wiping operation, and then the determination part 5 determines the presence/absence of a reaction of the detector 3. Therefore, it is possible to render the rest of wiping emerging on the surface by deleting the marking 81. Similar to the flowchart of FIG. 14, the flowchart of FIG. 15 is suitable for a touch sensor serving as the detector 3.

Figure 14:
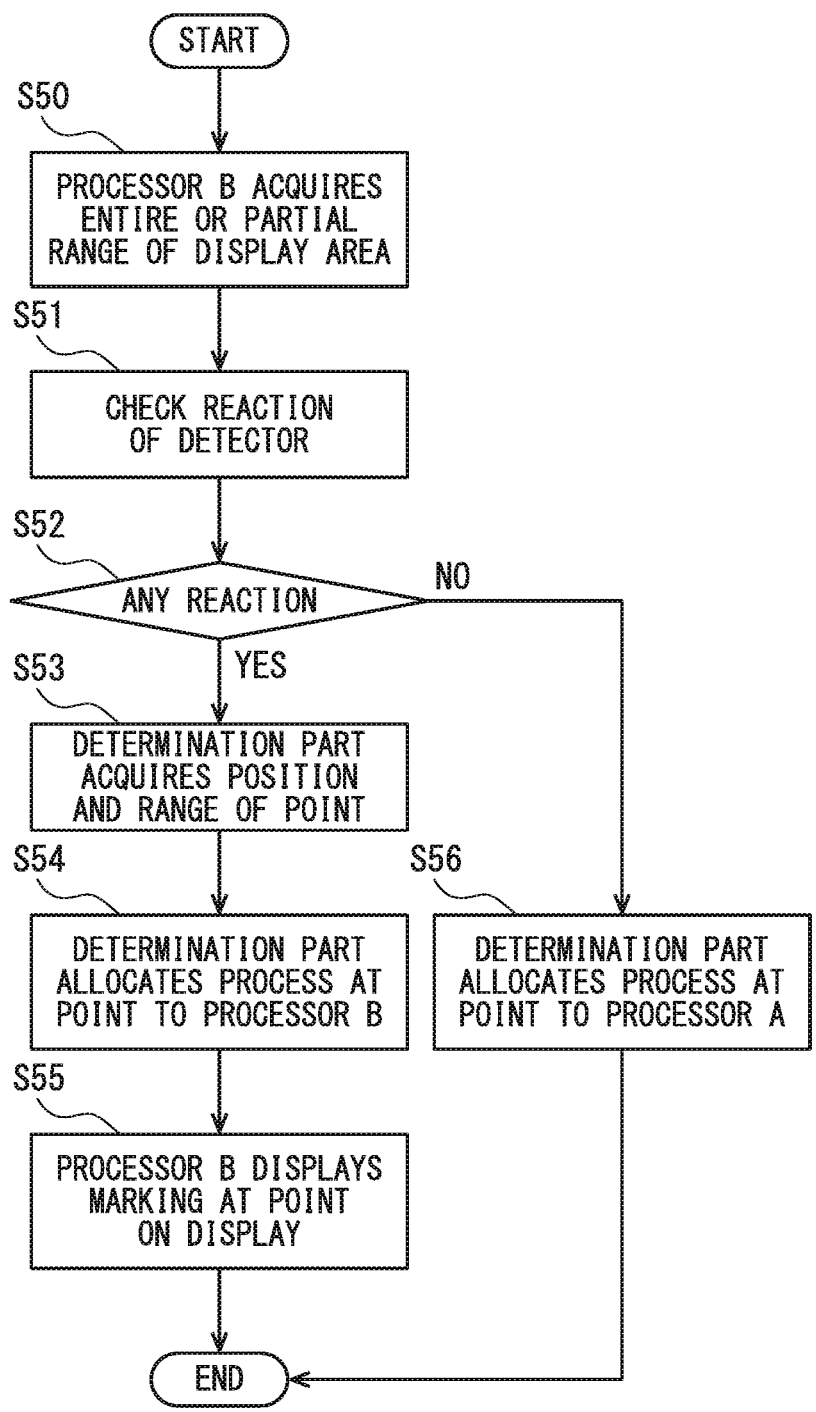
FIG. 14 is a flowchart for explaining an example of the operation of the display device 1a (second embodiment) shown in FIG. 9.
Figure 15:
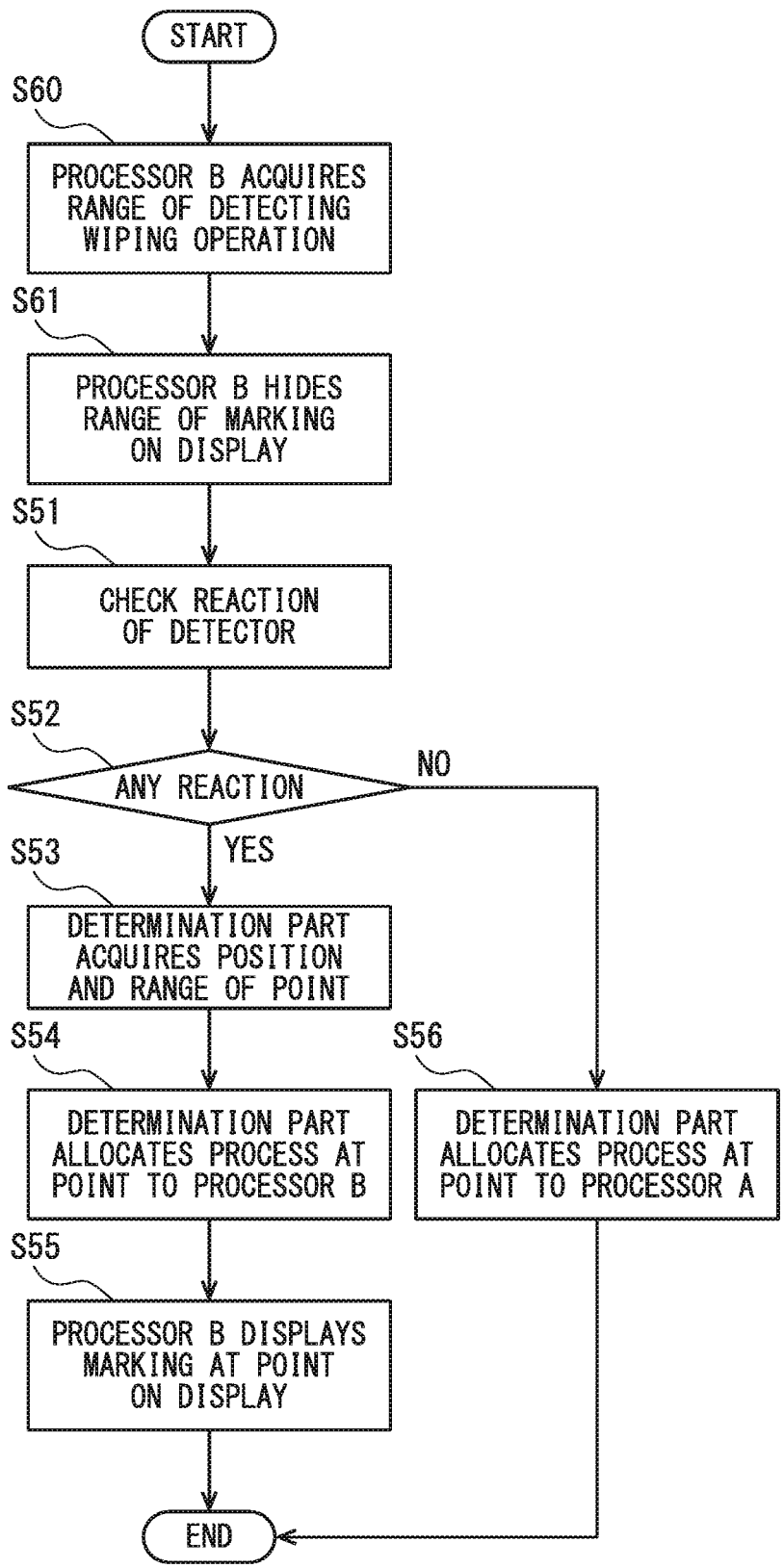
FIG. 15 is a flowchart for explaining an example of the operation of the display device 1a (second embodiment) shown in FIG. 9.

The flowchart of FIG. 15 differs from the flowchart of FIG. 14 in that it introduces steps S60 and S61 instead of step S50. Upon detecting a wiping operation, the processor B42 acquires a range of detecting a wiping operation based on the outcome of the detector 3 (step S60). Next, the processor B42 hides the range of the marking 81 on the display 2 (step S61). In FIG. 15, a series of steps following step S51 are similar to the foregoing steps shown in FIG. 14.

Figure 16:
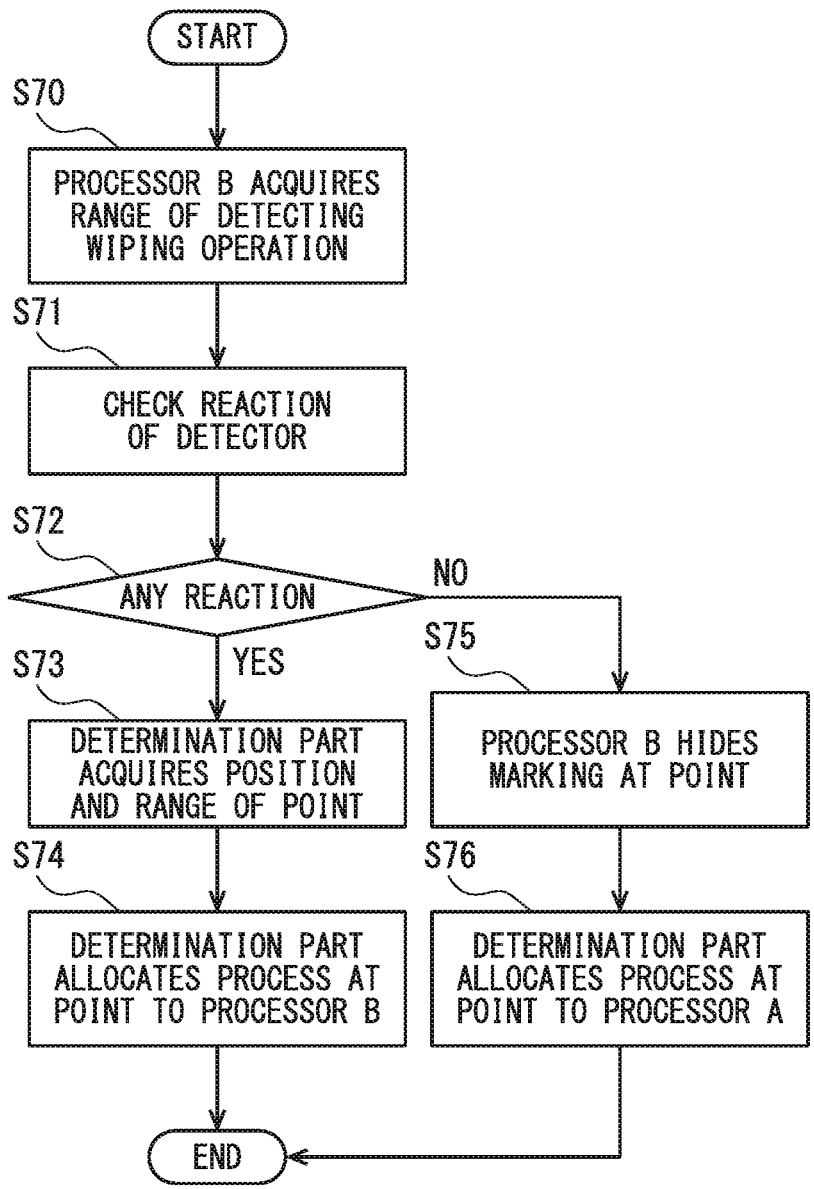
FIG. 16 is a flowchart for explaining an example of the operation of the display device 1a (second embodiment) shown in FIG. 9.

Next, a further example of the operation of the display device 1a shown in FIG. 9 will be described with reference to FIG. 16. This operation is an example of the operation of the display device 1a when a user wipes out stains. According to this operation, the determination part 5 determines the presence/absence of a reaction of the detector 3 upon detecting a wiping operation, and then the processor B42 deletes the marking 81 when the detector 3 triggers no reaction. In this case, the processor B42 deletes the range of the marking 81 in which the determination part 5 determines that the stain 80 has been wiped out. Similar to the flowchart of FIG. 15, the flowchart of FIG. 16 is suitable for a touch sensor serving as the detector 3.

Upon detecting a wiping operation, the processor B42 obtains the range of detecting a wiping operation based on the outcome of the detector 3 (step S70). Next, the determination part 5 checks a reaction of the detector 3 (step S71). Based on the checking result of step S71, the determination part 5 determines whether or not the detector 3 triggers a reaction (step S72). When the detector 3 triggers a reaction at a point (i.e. YES in step S72), the determination part 5 acquires the position of the point and its range (step S73). Next, the determination part 5 makes a setting to allocate the process at the point to the processor B42 (step S74). When the determination part 5 determines that no reaction is triggered by the detector 3 in step S72 (i.e. NO in step S72), the processor B42 hides the marking 81 at the point (step S75). Next, the determination part 5 makes a setting to allow the process at the point to the processor A41 (step S76). Thus, the determination part 5 exits the process.

Figure 11:
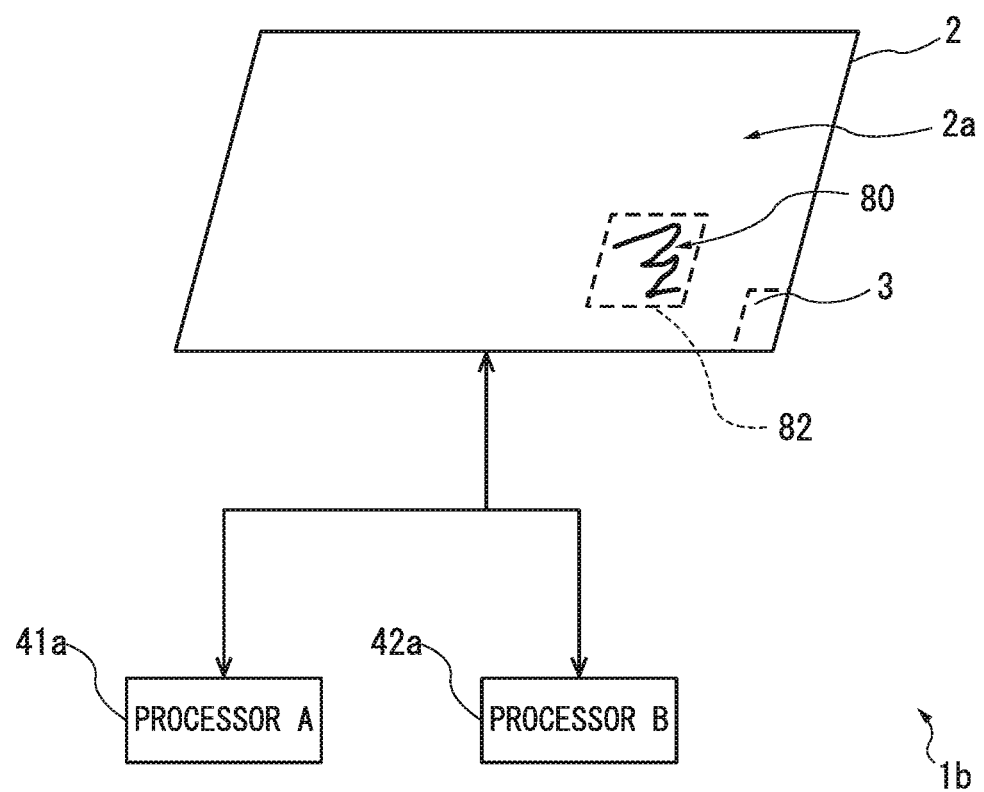
FIG. 11 is a system diagram showing a variation of the display device 1a shown in FIG. 9.

As shown in FIG. 11, it is possible to preclude the determination part 5 from the display device 1a shown in FIG. 9. FIG. 11 shows a display device 1b including the display 2, the detector 3, a processor A41a, and a processor B42a. In the display device 1b, both the processors A41a and B42a input an input operation made by a user. Then, the processor A41a invalidates a user's input operation at the marked area. On the other hand, the processor B42a invalidates a user's input operation at areas other than the marked area.

According to the present embodiment described above, it is possible to improve an operating sensation by preventing an unexpected reduction of operability. In this case, the process for operations at the marked area 82 and the process for operations at other areas are separately allocated to and executed by the processor B42 (or the processor B42a) and the processor A41 (or the processor A41a). For this reason, it is possible to produce and change programs with ease.

Third Embodiment

The third embodiment of the present invention is identical to the second embodiment of the display device 1a shown in FIG. 9 in terms of the configuration, but the third embodiment differs from the second embodiment in terms of the operation. In this connection, the third embodiment is designed such that the detector 3 shown in FIG. 9 is configured of a touch sensor and a camera. The third embodiment is designed to detect stains by use of a touch sensor and a camera constituting the detector 3. The third embodiment is able to improve a detection precision by detecting stains, which cannot be detected by a touch sensor, by use of a camera. In addition, the third embodiment provides a function of managing the level of stains in addition to a function of detecting the presence/absence of stains.

FIG. 17 shows levels of stains used by the third embodiment. FIG. 17 shows various levels of stains, namely T Level having level 0 through level 2, and S Level having level 0 through level 2. T Level is determined depending on the detection result of a touch sensor constituting the detector 3. S Level is determined depending on the detection result of a camera constituting the detector 3. T Level=0 indicates absence of erroneous operations. T Level=1 indicates presence of erroneous operations. T Level=2 indicates presence of erroneous operations after a wiping operation. S Level=0 indicates no stains. S Level=1 indicates presence of stains. S Level=2 indicates presence of stains after a wiping operation. The relationship of magnitude among those levels refer to S0=T0<S1<S2<T1<T2. Herein, S0 represents S Level=0.

Figure 18:
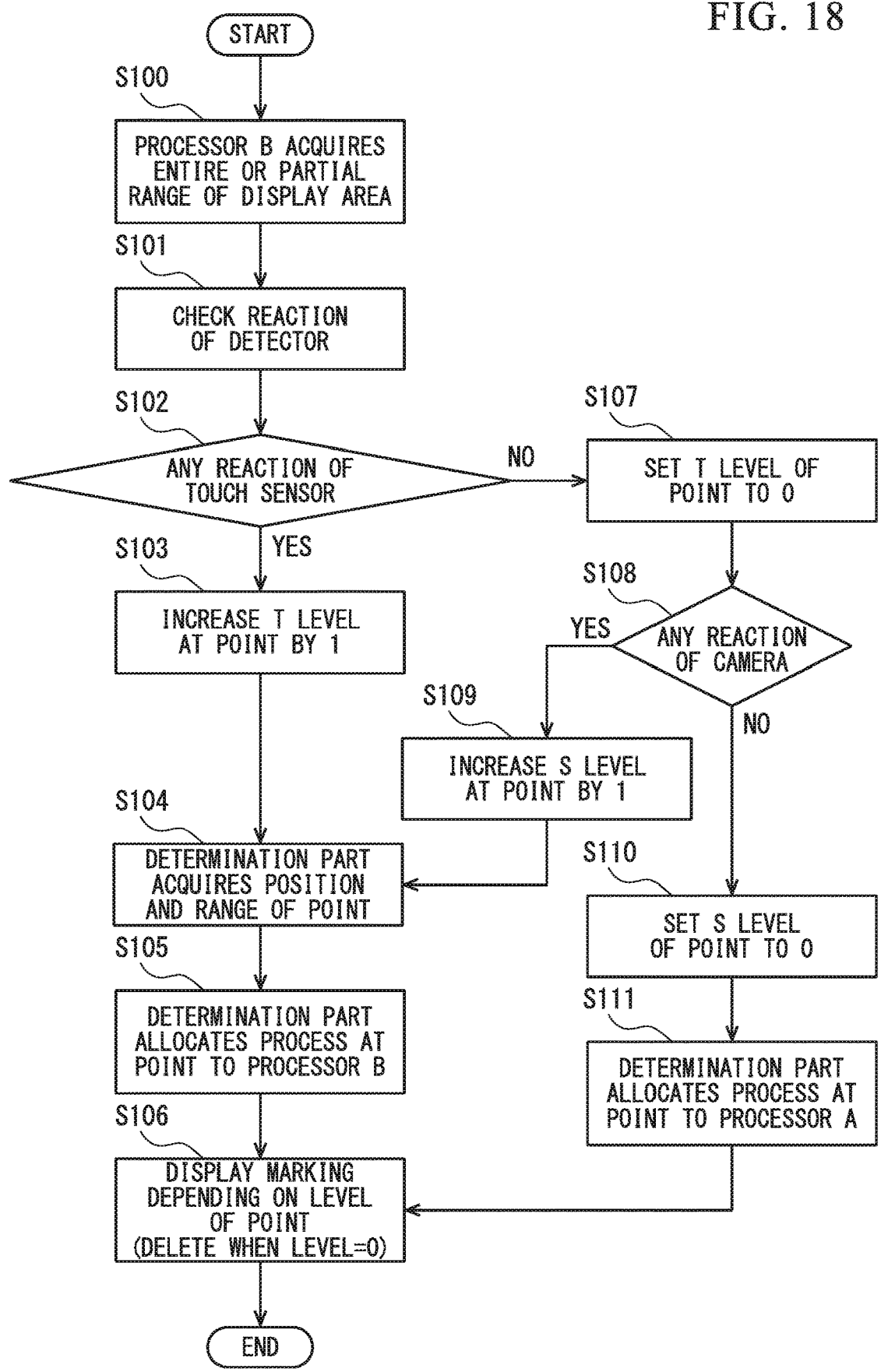
FIG. 18 is a flowchart for explaining an example of the operation of the display device 1a (third embodiment) shown in FIG. 9.

Next, an operation to display the marking 81 at the stained point on the display device 1a shown in FIG. 9 will be described with reference to FIG. 18. When a user does not perform an input operation, the processor B42 acquires the detection result of the detector 3 with respect to the entire display area or a partial area (step S100). Next, the determination part 5 checks a reaction of the detector 3 (step S101). When a touch sensor triggers a reaction at a point (i.e. YES in step S102), the determination part 5 raises T Level for the point by 1 (step S103). Next, the determination part 5 acquires the position of the point and its range (step S104). Next, the determination part 5 makes a setting to allocate the process at the point to the processor B42 (step S105). Next, the determination part 5 displays the marking 81 depending on T Level or S Level at the point (step S106). When both T Level and S Level are set to 0, the determination part 5 deletes the marking 81.

When a touch sensor triggers no reaction at a point (i.e. NO in step S102), the determination part 5 sets T Level at the point to 0 (step S107). Next, when a camera triggers a reaction at a point (i.e. YES in step S108), the determination part 5 raises S Level at the point by 1 (step S109). Next, the determination part 5 executes the process of step S104. When a camera triggers no reaction at a point (i.e. NO in step S108), the determination part 5 sets S Level at the point to 0 (step S110). Next, the determination part 5 makes a setting to allocate the process at the point to the processor A41 (step S111). In this connection, the processors A41 and B42 carry out the same operations as those of the second embodiment.

Figure 19:
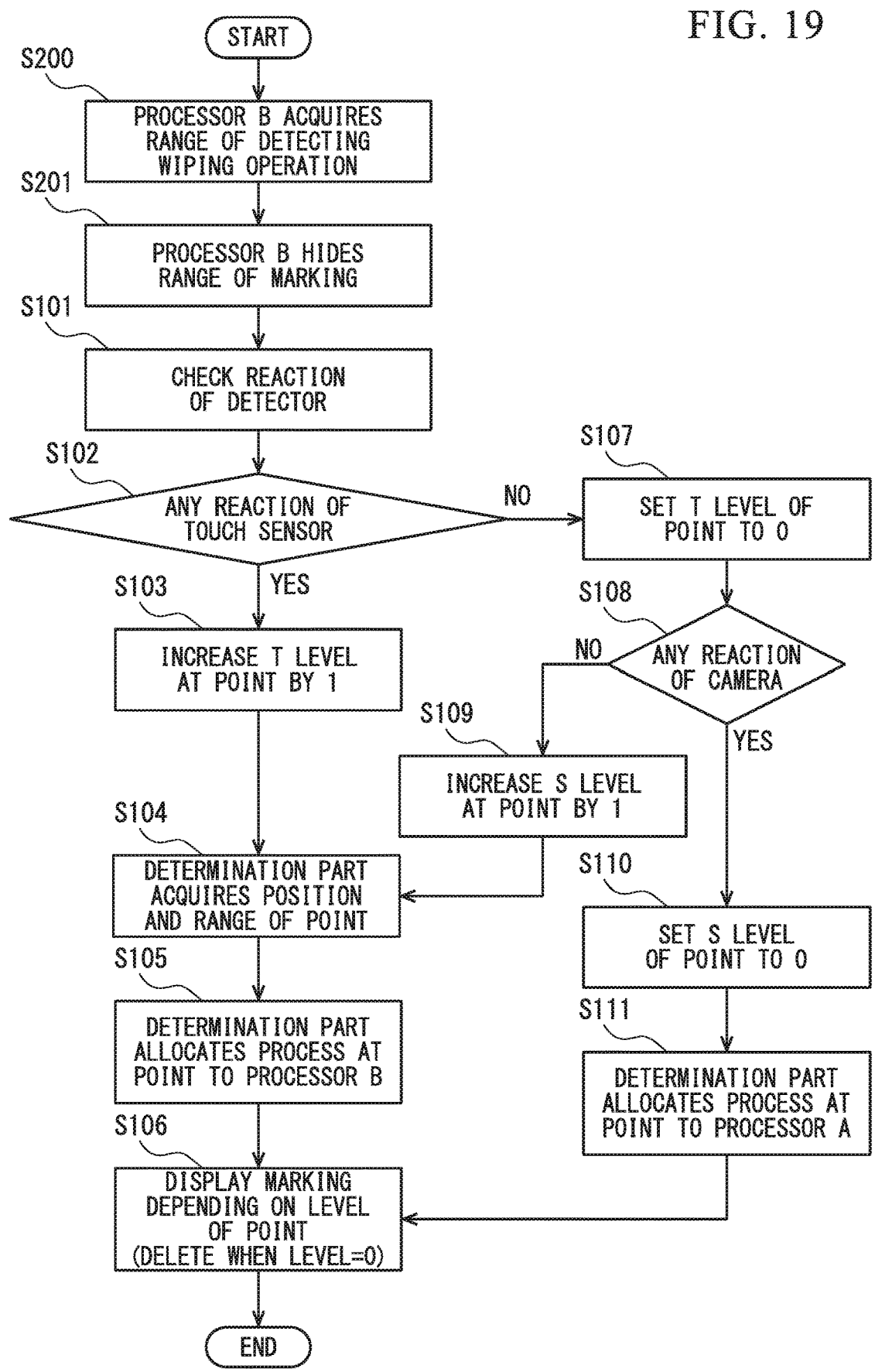
FIG. 19 is a flowchart for explaining an example of the operation of the display device 1a (third embodiment) shown in FIG. 9.

Next, an example of the operation to be carried out upon detecting a wiping operation on the display device 1a shown in FIG. 9 will be described with reference to FIG. 19. The flowchart shown in FIG. 19 differs from the flowchart shown in FIG. 18 in that it introduces steps S201 and S202 instead of step S100. Upon detecting a wiping operation, the processor B42 obtains a range of detecting a wiping operation based on the outcome of the detector 3 (step S200). Next, the processor B42 hides the range of the marking on the display 2 (step S201). A series of steps following step S101 are identical to the foregoing steps in FIG. 18.

According to the present embodiment as described above, it is possible to improve an operating sensation by preventing an unexpected reduction of operability. In this connection, the process for operations at points of detecting stains and the process for operations at other points are separately allocated to and executed by the processor B42 (or the processor B42a) and the processor A41 (or the processor A41a). For this reason, it is possible to produce and change programs with ease. In addition, it is possible to display the marking 81 depending on the level of stains by managing the level of stains.

Fourth Embodiment

Figure 20:
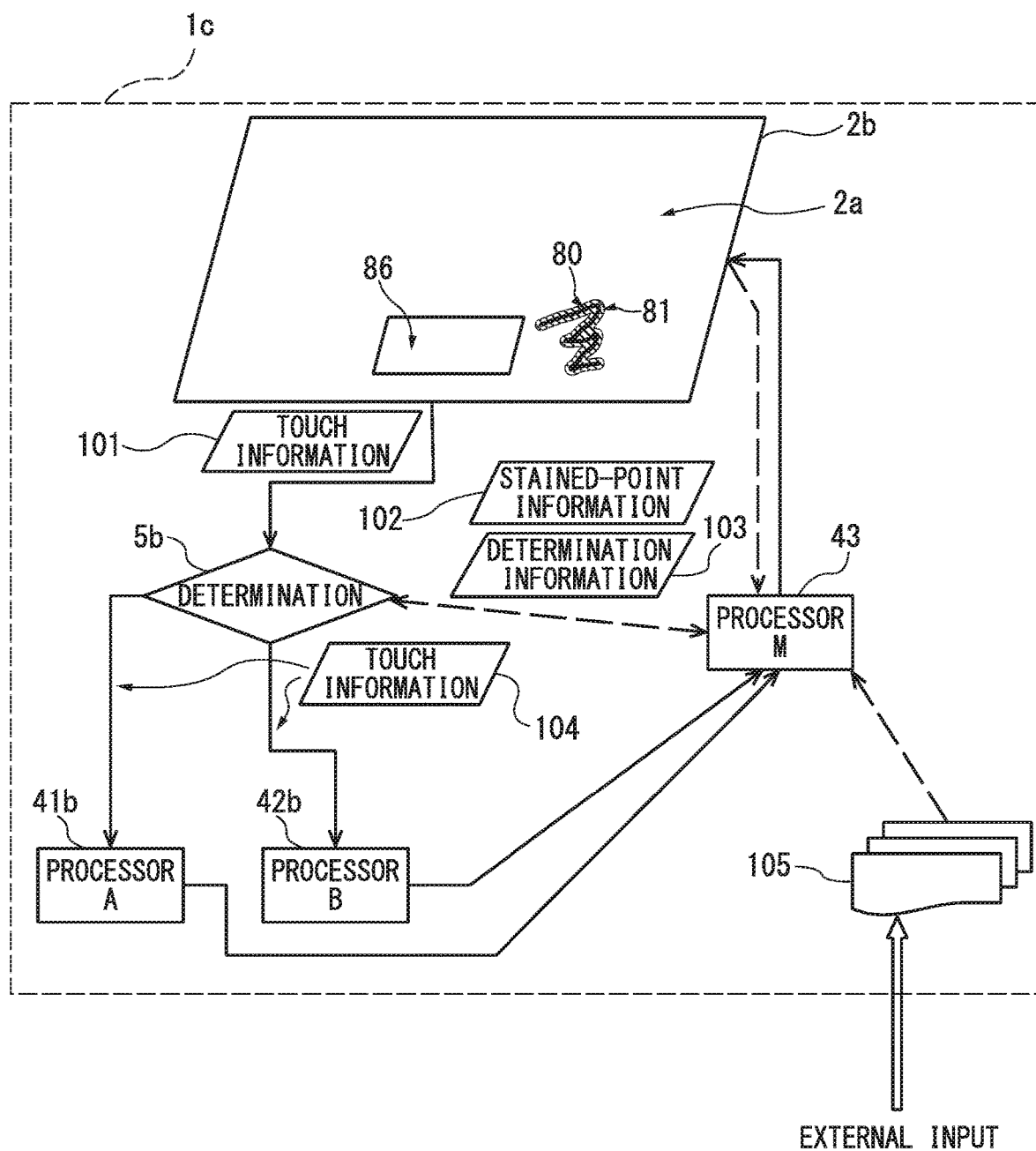
FIG. 20 is a system diagram showing an example of the configuration of the fourth embodiment of the present invention.

The fourth embodiment of the present invention will be described with reference to FIGS. 20 to 29. FIG. 20 is a system diagram showing an example of the configuration of the fourth embodiment. FIG. 20 shows a display device 1c including a display 2b, a determination part 5b, a processor A41b, a processor B42b, and a processor M43. A combination of the determination part 5b, the processor A41b, the processor B42b, and the processor M43 is equivalent to the processor 4 of the first embodiment shown in FIG. 1. For example, the determination part 5b, the processor A41b, the processor B42b, and the processor M43 can be each configured using the same CPU or different CPUs together with a memory device; hence, they carry out their operations using each CPU executing predetermined programs.

The display 2b is equivalent to a combination of the display 2 and the detector 3 shown in FIG. 1. For example, the display 2b is a display configured to display a content 86 on the display screen 2a and to accept input operations via touch operations. The display 2b detects an input operation made by a user, and then it sends touch information 101, i.e. the information representing the touched position, to the determination part 5b.

The determination part 5b determines whether the touched point is a user-operable point or a stained point invalidating its operation, and then it sends touch information 104, representing the information of touch operations, to the processor A41b or the processor B42b separately. Upon determining that a process of checking stained points reveals the existence of a stained point, the determination part 5b sends stained-point information, i.e. the information (representing the position and the range of a stained point), to the processor M43.

The processor M43 carries out a process for user's touch operations, a process to display contents, and a process to check stained points, and then it sends determination information 103, i.e. results of processing, to the determination part 5b. Due to the existence of a stained point, the processor M43 displays the marking 81 so as to visualize the point of the stain 80 on the display screen 2a.

The processor A41b processes normal user's operations (i.e. any user's operations not involved in stained points). For example, the processor A41b recognizes user's touch operations, gestures, content-related operations (e.g. pressing buttons), and the like so as to send the results of recognition to the processor M43.

The processor B42b processes user's operations against stained points. Upon detecting a wiping operation, for example, the processor B42b conveys it to the processor M43.

In this connection, the content 86 is a content displayed on the display screen 2a of the display 2b, representing information regarding images and moving images. In addition, external inputs 105 may be external input information representing the content 86, e.g. video signals and data contents.

The display device according to the fourth embodiment is not necessarily limited to the display device 1c having a display-integrated configuration integrally combining the display 2b, the determination part 5b, the processor A41b, the processor B42b, and the processor M43 shown in FIG. 20. For example, it is possible to employ a display device 1d shown in FIG. 21, which is divided into a display 11 having the display 2b and a processing device 12 including the determination part 5b, the processor A41b, the processor B42b, and the processor M43.

Figure 21:
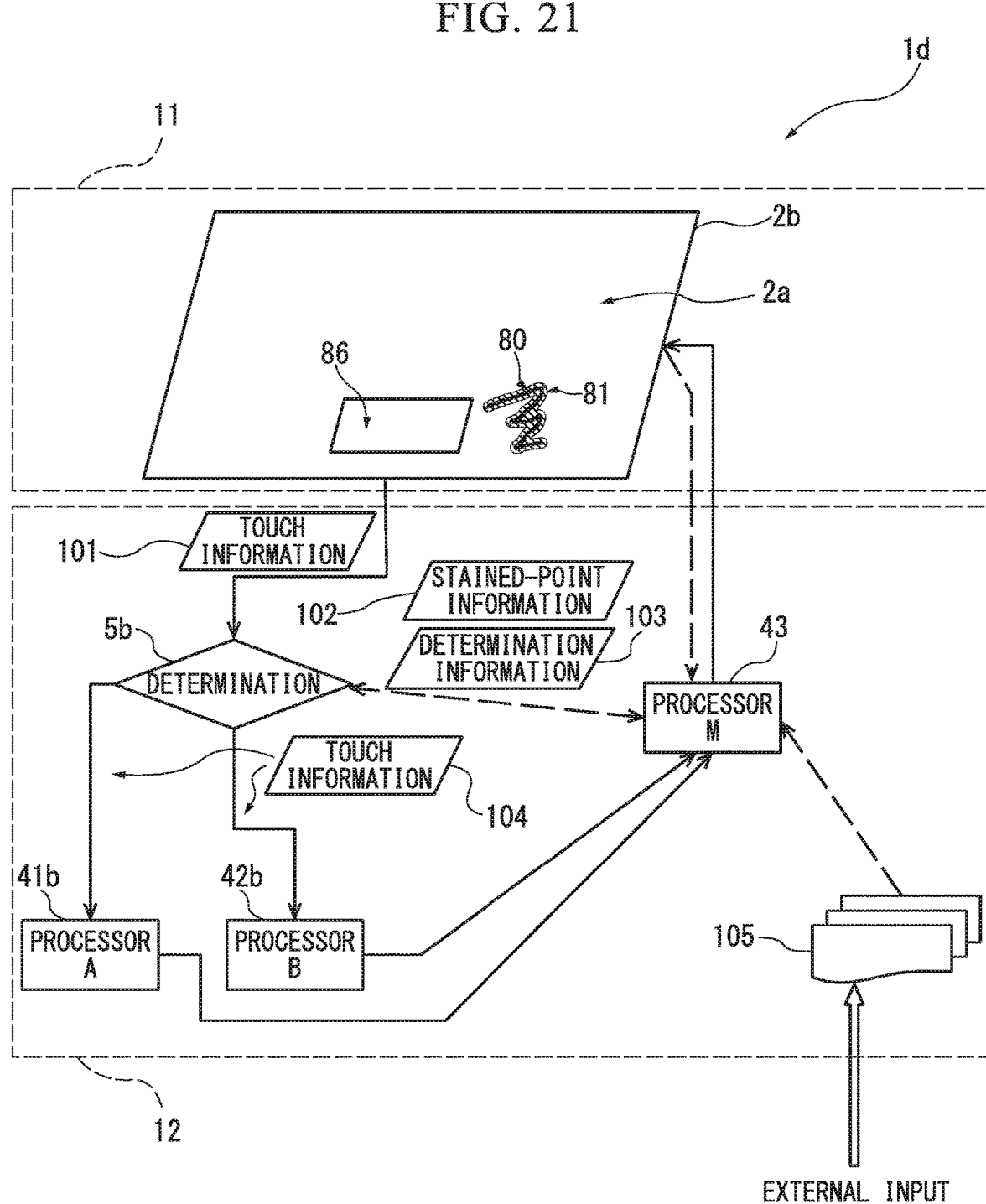
FIG. 21 is a system diagram showing a variation of a display device 1c shown in FIG. 20.
Figure 22:
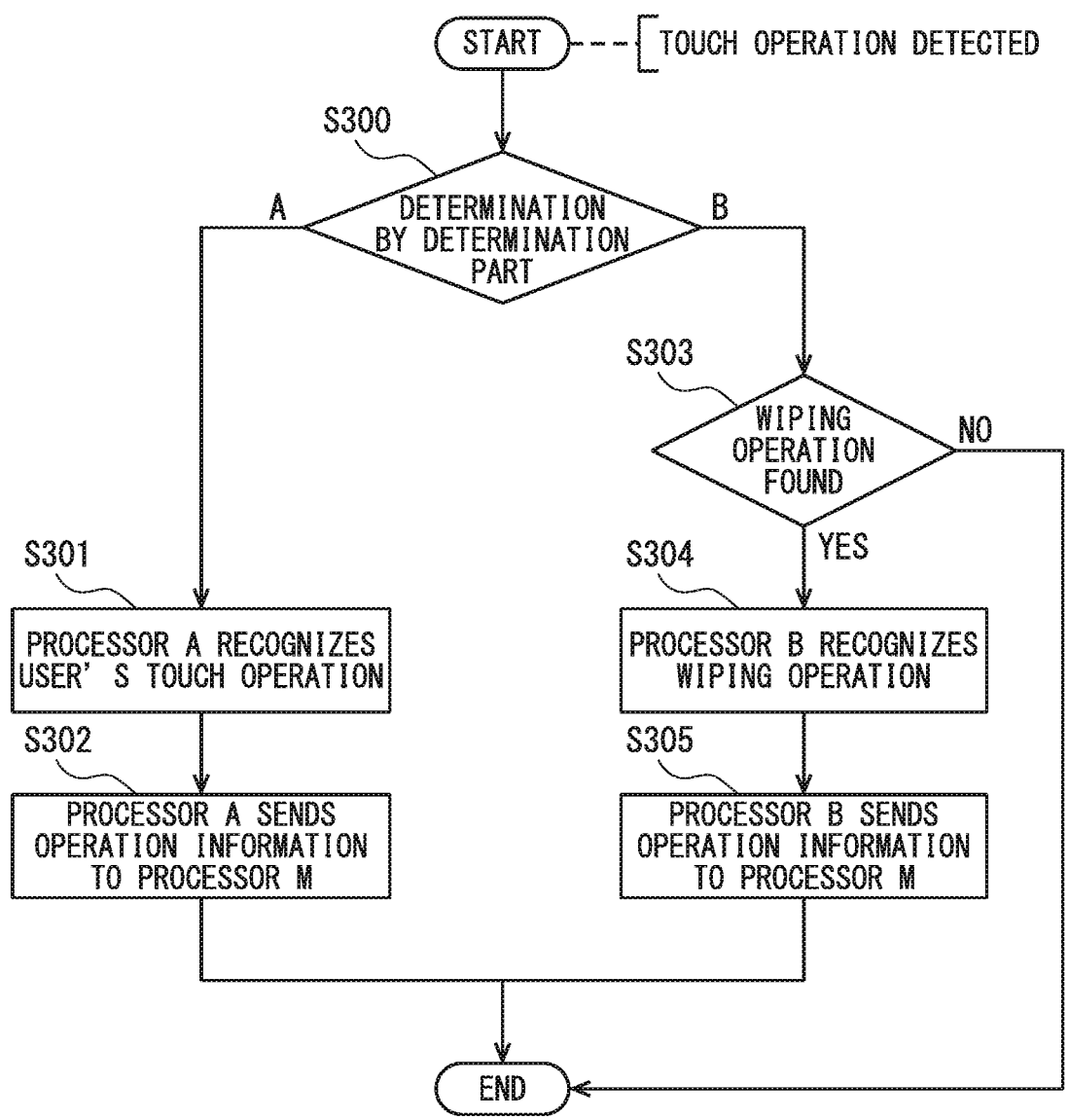
FIG. 22 is a flowchart for explaining an example of the operation of the display device 1c shown in FIG. 20.
Figure 23:
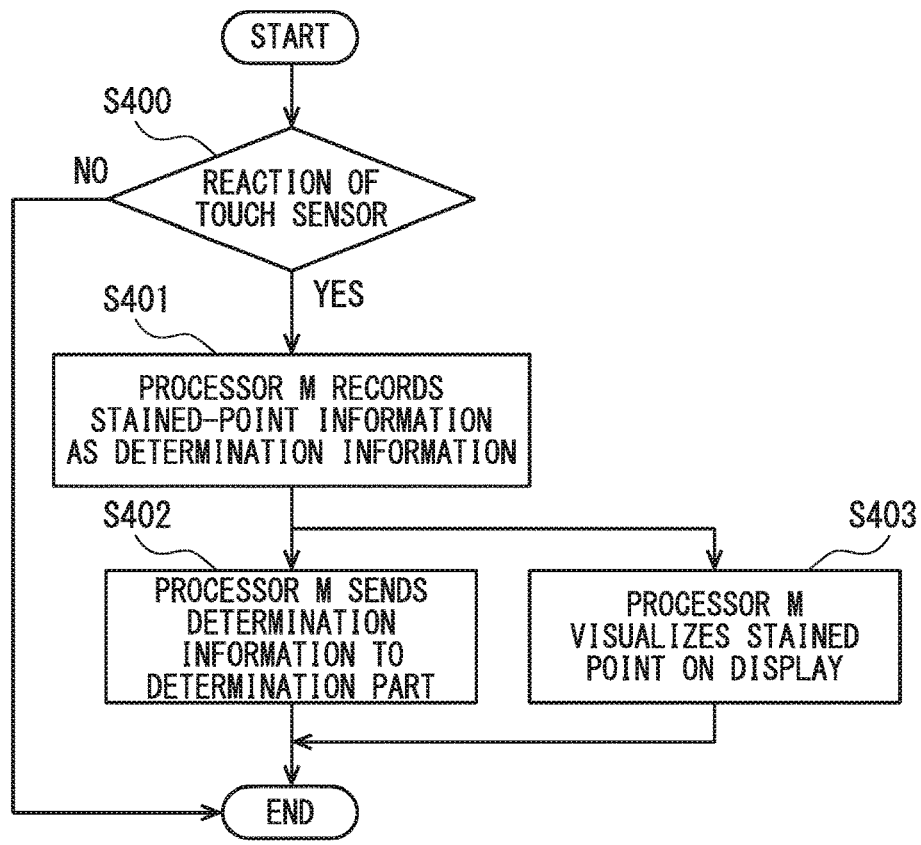
FIG. 23 is a flowchart for explaining an example of the operation of the display device 1c shown in FIG. 20.
Figure 24:
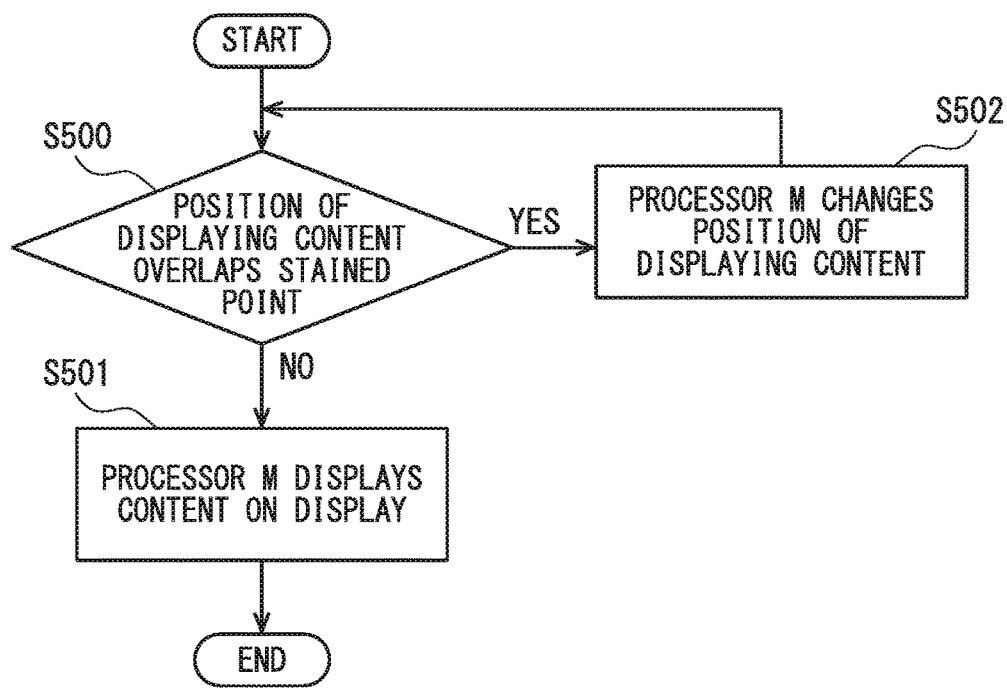
FIG. 24 is a flowchart for explaining an example of the operation of the display device 1c shown in FIG. 20.

Next, examples of operations performed by the display device 1c shown in FIG. 20 or the display device 1d shown in FIG. 21 will be described with reference to FIGS. 22 to 27. FIG. 22 shows an example of processing upon detecting touch operations. FIG. 23 shows an example of processing for checking stains. FIG. 24 shows an example of processing for displaying contents.

When the display 2b detects an input operation on the display screen 2a, the touch information 101, resulting from a user's touch operation on the display 2b, is sent to the determination part 5b. Based on the determination information 103 received from the processor M43, the determination part 5b determines whether the touch information 101 indicates a touched point belonging to a user-operable area A or a user-operation-invalidated area (i.e. a stained point) B, thus sending touch information 104 to the processor A41b or the processor B42b (step S300 in FIG. 22).

The processor A41b recognizes normal user's operations (step S301). The processor A41b recognizes a touch operation or a gesture for the content 86 so as to send operation information to the processor M43 (step S302). Thus, the processor A41b exits the process. On the other hand, the processor M43 carries out a process for user's operations.

For example, the processor M43 carries out a process to be activated upon pressing a button.

The processor B42b monitors user's operations for stained points (step S303). When a user's operation for a stained point is not a wiping operation (i.e. NO in step S303), the processor B42b exits the process. Upon detecting a wiping operation made by a user (i.e. YES in step S303), the processor B42b conveys it to the processor M43 (step S304 or S305). Thus, the processor B42b exits the process. The processor M43 checks the existence/absence of stains within the range of carrying out a wiping operation.

The process of checking stains is triggered after a user carries out a wiping operation input from the processor B42b or when none of users carries out a touch operation. The latter situation would be assumed as the start timing in a time zone at midnight counted by a timer or the start timing when no touch operation is carried out in a certain period of time.

According to the process of checking stains with the processor M43 as shown in FIG. 23, the processor M43 determines whether any reaction is triggered by a touch sensor without any user's operations (step S400). When no reaction is triggered by a touch sensor (i.e. NO in step S400), the processor M43 exits the process. Due to a reaction triggered by a touch sensor (i.e. YES in step S400), the processor M43 recognizes the stained point so as to record the information regarding the stained point as the determination information (step S401). Next, the processor M43 sends the checking result to the determination part 5b as the determination information (representing the position and the range) 103 (step S402). In addition, the processor M43 displays the marking 81 on the display 2b so as to visualize the stained point (step S403).

Figure 25:
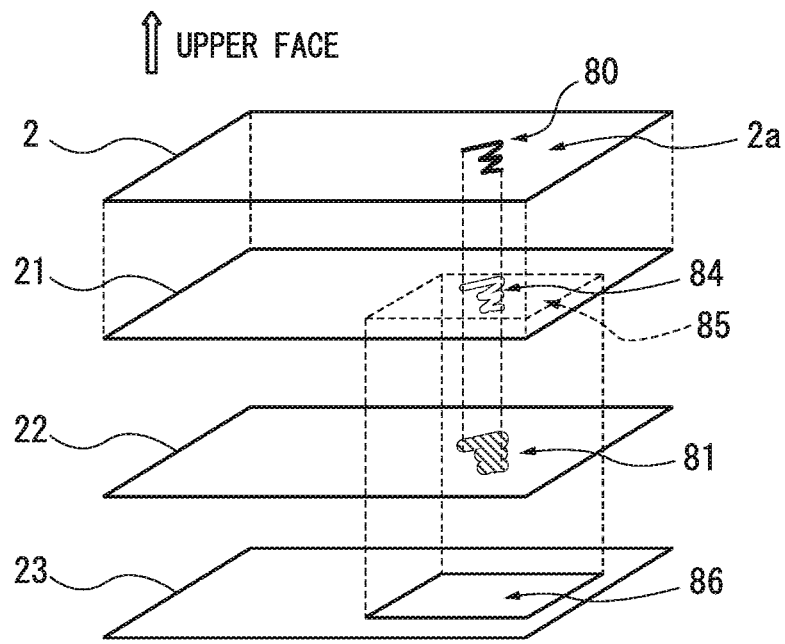
FIG. 25 is an explanatory drawing for explaining an example of the operation of the display device 1c shown in FIG. 20.

The processor M43 carries out processes for events input by the processor A41b and the processor B42b. In addition, the processor M43 displays or manages the input contents. When the position of displaying the content overlaps the stained point as shown in FIG. 25, for example, the processor M43 may change the position of displaying the content not to overlap the stained point. Moreover, the processor M43 may solely change the position of a user interface (UI) such as an OK button.

FIG. 25 is a schematic view showing an example of the superposed relationship between the marking 81 and content 86. In a process of displaying contents, the processor M43 separately renders the content 86 and the marking 81 indicating the stained area by way of a layer 23 for rendering contents and a layer 22 for rendering the stained area. Then, the processor M43 produces a superposed image 21 superposing the content 86 and the marking 81 so as to eventually display images on the display 2b. At this time, the processor M43 produces the superposed image 21 in which the layer 22 for rendering the stained area should be certainly formed above the layer 23 for rendering contents. In FIG. 25, a stained area 84 is an area corresponding to the stain 80. In addition, a content-displaying area 85 is an area corresponding to the content 86.

Figure 26:
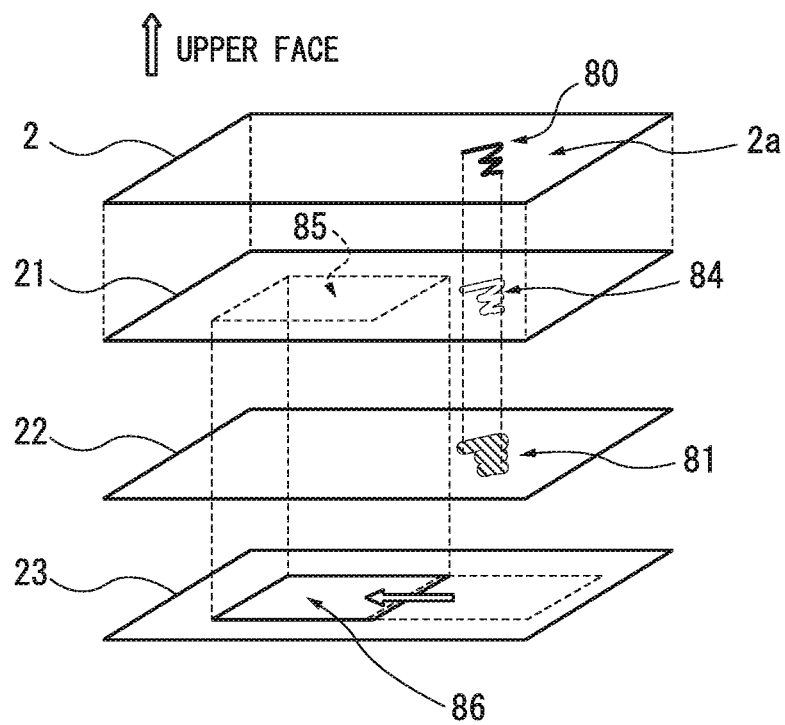
FIG. 26 is an explanatory drawing for explaining an example of the operation of the display device 1c shown in FIG. 20.
Figure 27:
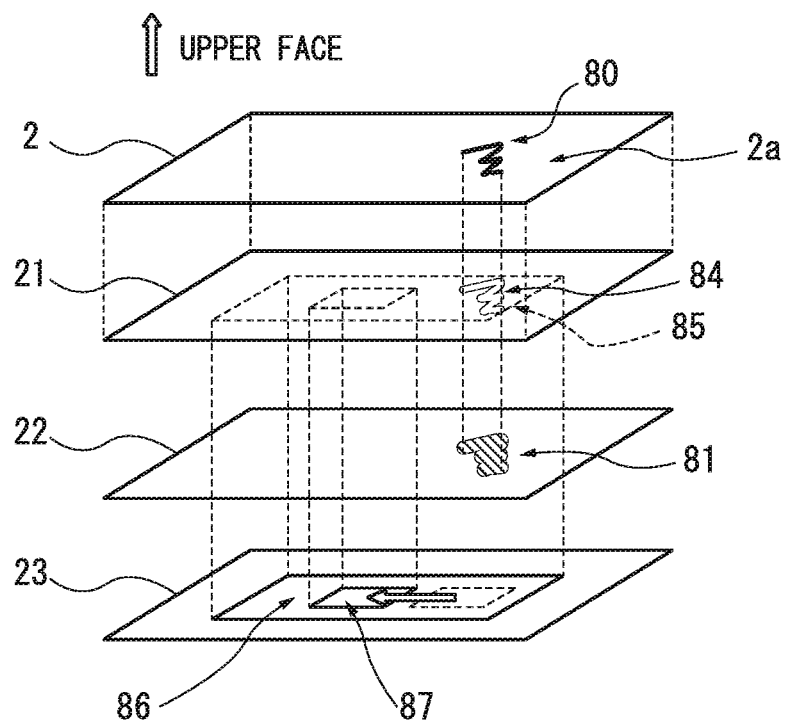
FIG. 27 is an explanatory drawing for explaining an example of the operation of the display device 1c shown in FIG. 20.

When the stained point overlaps the position of displaying contents, for example, the processor M43 changes the position of displaying the content 86 not to overlap the point of the stain 80 as shown in FIG. 26 (see an arrow indicating a change of position on the layer 23). In addition, the processor M43 may solely change the position of a user interface (UI) 87 such as an OK button as shown in FIG. 27 (see an arrow indicating a change of position on the layer 23).

Figure 28:
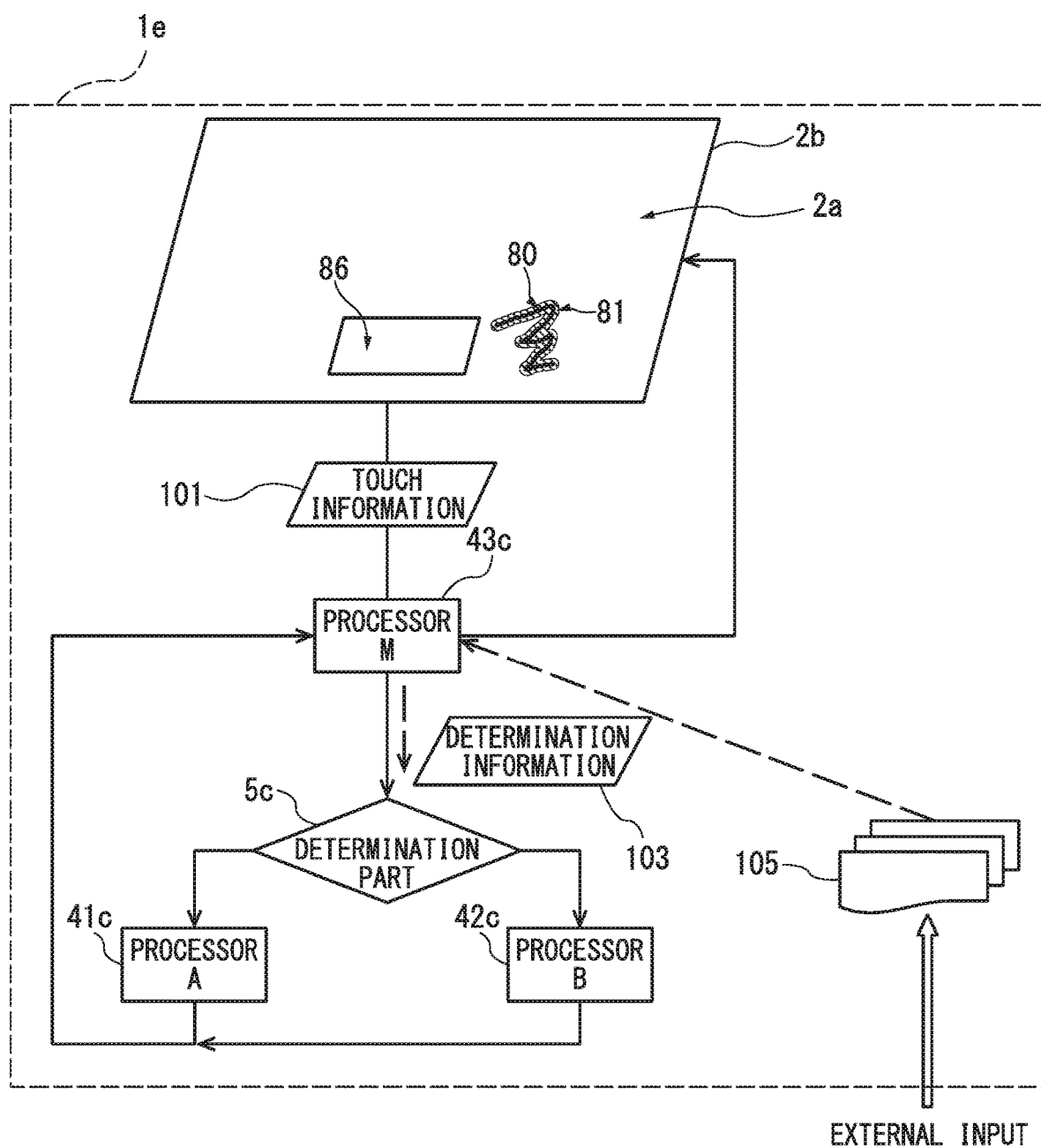
FIG. 28 is a system diagram showing a variation of the display device 1c shown in FIG. 20.
Figure 29:
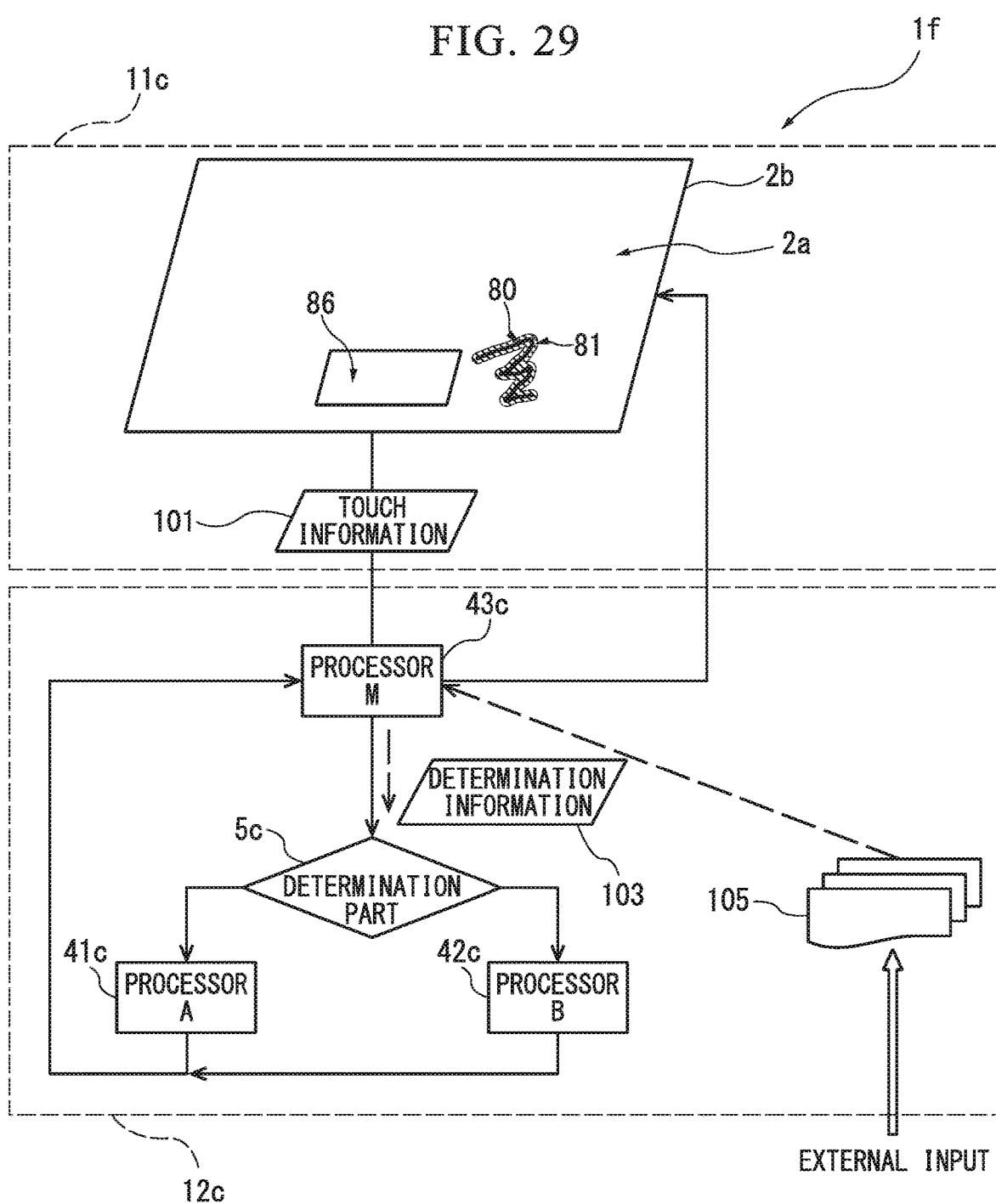
FIG. 29 is a system diagram showing a variation of a display device 1d shown in FIG. 21.

For example, the configuration of the display device 1c shown in FIG. 20 can be transformed to the configuration of a display device 1e shown in FIG. 28. In addition, the configuration of the display device 1d shown in FIG. 21 can be transformed to the configuration of a display device 1f shown in FIG. 29. In the display device 1e shown in FIG. 28 or the display device 1f shown in FIG. 29, the touch information 101 is input to a processor M43c while the determination information 103 is input to a determination part 5c through the processor M43c. In this connection, the determination part 5c, a processor A41c, a processor B42c, and the processor M43c shown in FIG. 28 or FIG. 29 are equivalent to the determination part 5b, the processor A41b, the processor B42b, and the processor M43 shown in FIG. 20 or FIG. 21; hence, they carry out the same operations precluding the operation how to handle the touch information 101.

According to the present embodiment described above, it is possible to improve an operating sensation by preventing an unexpected reduction of operability. In this case, the process for operations against stain-detected points and the process for operations against other points are separately allocate to and executed by the processor B42b (or the processor B42c) and the processor A41b (or the processor A41c). In addition, the processor M43 carries out a process of checking stains and a process of displaying contents and markings. Therefore, it is possible to produce and change programs with ease. Since the processor M43 is able to adjust the positional relationship between the markings for visualizing stains and the contents, it is possible to improve operability and visibility for contents.

<Basic Configuration>

Figure 35:
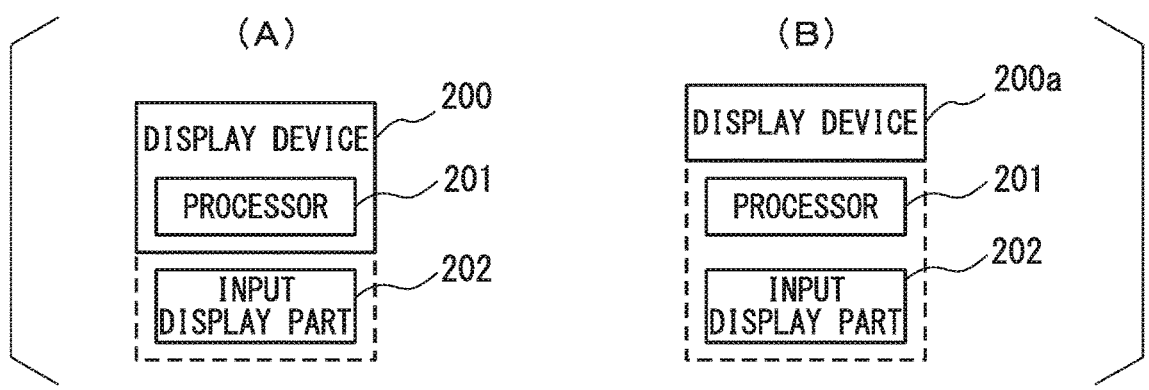
FIG. 35 is a block diagram showing the basic configurations of the embodiments of the present invention.

FIG. 35 shows an example of the basic configuration covering the first to fourth embodiments and their variations. FIG. 35(A) shows a display device 200 including at least a processor 201 according to an example of the basic configuration for the foregoing embodiments. Herein, the display device 200 may include an input display part 202. The input display part 202 having an input display screen implements functions as an input part for inputting user's operations on the input display screen and a display part for displaying images on the input display screen. In this connection, the input display screen of the input display part 202 would be either a transmission type of displaying images or a reflection type of displaying images. The processor 201 carries out a stain detecting step for detecting stains and a stained-point displaying step for displaying a predetermined indication at a first point of the input display part 202 corresponding to the position of the stained point detected above. In addition, the processor 201 carries out a step for detecting an input operation on the input display part 202, and therefore it carries out a process depending on the input operation upon detecting the input operation at a second point other than the first point.

Herein, the "first point" indicates a spot or a site on the input display screen of the input display part 202 in correspondence with the position of a stain detected in the stain detecting step. In addition, the "second point" indicates a spot or a site on the input display screen of the input display part 202 other than the first point. That is, the "second point" is a spot or a site, which does not correspond to the position of a stain detected in the stain detecting step, on the input display screen of the input display part 202. The "predetermined indication" which is displayed at the first point on the input display part 202 in the stained-point displaying step is an indication for visualizing the first point in view of users. For example, the "predetermined indication" is an indication of rendering a predetermined marking at the first point or in a certain area covering the first point.

The "stain detecting step" is a process for detecting stains on the input display part 202. In the stain detecting step, for example, it is possible to detect stains according to an input to the input display part 202. Herein, the "input to the input display part 202" is applied to the input display part 202, such as a predetermined physical value or variations of physical values detectable with the input display part 202. The input to the input display part 202 may include an action of a user performing an input operation and an action of a user not performing an input operation. In the stain detecting step, for example, it is possible to determine the detected point as the stained point upon detecting an input to the input display part 202 when a user does not perform an input operation or when it is assumed that a user may not perform an input operation. That is, the processor 201 implements a step for determining whether or not to carry out an input operation, and then it may proceed to the stain detecting step and the stained-point displaying step upon determining that an input operation is not carried out. Herein, the "step for determining whether or not to carry out an input operation" is a process of determining whether it is highly likely or not for a user to carry out a predetermined input operation on the input display part 202. For example, the step for determining whether or not to carry out an input operation may include at least one of a step for determining whether or not a user carries out an input operation based on the outcome of a predetermined sensor or an imaging device, and a step for determining whether or not to satisfy a condition presuming that a user does not carry out an input operation. When a human sensor or a camera is used to determine that nobody is found around the device, for example, the processor 201 may determine that a user does not carry out an input operation. Alternatively, the processor 201 may determine that a user does not carry out an input operation on the condition that the determination time falls within the period of time that a manager specifies and predicts that nobody would operate the device. In this connection, the stain detecting step is executed when it comes to a predetermined time, after a predetermined time has elapsed, or when a user carries out a predetermined operation.

The "process depending on an input operation" to be executed when an input operation is detected at the second point other than the first point is a process depending on the manner of an input operation. The "process depending on an input operation" is a process whose details will be changed depending on the manner of an input operation. For example, the process whose details will be changed depending on the manner of an input operation is a process for outputting the results of detecting the manner of an input operation. This may change the details of detection results to be output depending on the manner of an input operation. Alternatively, the process whose details will be changed depending on the manner of an input operation is a process for determining details depending on detection results upon detecting the manner of an input operation. This may change the details of the process to be determined depending on the manner of an input operation.

The input display part 202 corresponds to a combination of the display 2 and the detector 3 in the configuration of FIG. 1. In addition, the input display part 202 corresponds to the display 2b in the configuration of FIG. 20. Moreover, the processor 201 corresponds to the processor 4 in the configuration of FIG. 1. According to the display device 200, it is possible to improve an operating sensation by preventing an unexpected reduction of operability.

FIG. 35(B) shows a display device 200a according to another example of the basic configuration covering the foregoing embodiments, i.e. a display device to be controlled by the processor 201. In this case, the processor 201 implements a stain detecting step for detecting stains on the input display part 202, and a stained-point displaying step for displaying a predetermined indication at the first point of the input display part 202 corresponding to the position of a stain detected above. The display device 200a may be formed by integrally combining the processor 201 and the input display part 202, or it may be separated from the entirety or part of the processor 201 and the input display part 202. For example, the display device 200a may be equipped with a display of the input display part 202. When the display device 200a is separated from the input display pat 202, for example, the display device 200a may have a configuration to control the display of the input display part 202.

Heretofore, the present invention has been described in detail by way of the foregoing embodiments with reference to the drawings, but detailed configurations should not be limited to the foregoing embodiments; hence, the present invention may embrace any designs not departing from the essence of the invention.

REFERENCE SIGNS LIST 1, 1a, 1b, 1c, 1d, 1e, 1f, 200, 200a . . . display device
202 . . . input display part
2, 2b . . . display
2a . . . display screen
3 . . . detector
4, 201 . . . processor
41, 41a, 41b, 41c . . . processor A
42, 42a, 42b, 42c . . . processor B
43, 43c . . . processor M
5, 5b, 5c . . . determination part
80 . . . stain
81 . . . marking

The invention claimed is:

1. A display method adapted to a display device comprising an input display part and a processor configured to execute instructions, said display method comprising:
    detecting a stain at a stained position on the input display part;
    displaying a predetermined indication having an arbitrary shape to include the stained position on the input display part; and
    aborting a process indicated by an input operation erroneously occurring due to the stain at the stained position on the input display part.

2. The display method according to claim 1, further comprising detecting the input operation on the input display part,
    to validate the input operation at an unstained position other than the stained position on the input display part.

3. The display method according to claim 2, further comprising:
    stopping the predetermined indication displayed at the stained position on the input display part upon detecting a wiping operation to wipe off the stain at the stained position; and
    displaying the predetermined indication at the stained position again upon repeatedly detecting the stain at the stained position irrespective of the wiping operation applied to the stained position.

4. The display method according to claim 3, wherein the predetermined indication is changed in terms of at least one of brightness and color.

5. The display method according to claim 2, further comprising determining whether or not to carry out the input operation applied to one of the stained position and the unstained position on the input display part,
   wherein the predetermined indication is displayed at the stained position upon determining that the input operation is not carried out at the stained position.

6. The display method according to claim 1, wherein the stain is detected upon detecting an absence of a user's operation on the input display part.

7. The display method according to claim 1, further comprising:
   stopping the predetermined indication displayed at the stained position on the input display part upon detecting a wiping operation to wipe off the stain at the stained position; and
   displaying the predetermined indication at the stained position again upon repeatedly detecting the stain at the stained position irrespective of the wiping operation applied to the stained position.

8. The display method according to claim 1, wherein the stain is detected at a predetermined timing when a predetermined operation is carried out.

9. The display method according to claim 1, further comprising:
   detecting a wiping operation to wipe out the stained position on the input display part; and
   changing the predetermined indication in terms of at least one of brightness and color.

10. A display device, comprising:
    a detector configured to detect a stain at a stained position on an input display part; and
    a processor configured to execute instructions to:
      display a predetermined indication having an arbitrary shape to include the stained position on the input display part; and
      abort a process indicated by an input operation erroneously occurring due to the stain at the stained position on the input display part.

11. The display device according to claim 10, wherein the processor validates the input operation detected on the input display part at an unstained position other than the stained position.

12. The display device according to claim 11, wherein the processor executes the instructions to further:
    stop the predetermined indication displayed at the stained position on the input display part upon detecting a wiping operation to wipe off the stain at the stained position; and
    display the predetermined indication at the stained position again upon repeatedly detecting the stain at the stained position irrespective of the wiping operation applied to the stained position.

13. The display device according to claim 10, wherein, when the detector detects an operation to wipe out the stained position, the processor stops displaying the predetermined indication.

14. The display device according to claim 13, wherein, after a non-display mode of the predetermined indication upon detecting the operation to wipe out the stained position, the processor validates an operation at the marked position again when no response is made by the detector.

15. The display device according to claim 10, wherein the stain is detected upon detecting an absence of a user's operation on the input display part.

16. The display device according to claim 10, wherein the detector is further configured to detect a wiping operation to wipe out the stained position on the input display part, and
    wherein the processor changes the predetermined indication in terms of at least one of brightness and color.

17. A processor adapted to a display device including an input display part and a processor executing instructions to:
    display a predetermined indication having an arbitrary shape to include a stained position corresponding to a stain detected on the input display part; and
    abort a process indicated by an input operation erroneously occurring due to the stain at the stained position on the input display part.

18. The processor according to claim 17, wherein the processor executes the instructions to validate an input operation on the input display part upon detecting the input operation at an unstained position other than the stained position.

19. The processor according to claim 18, wherein the processor executes the instructions to further:
    stop the predetermined indication displayed on the input display part upon detecting a wiping operation to wipe off the stain at the stained position; and
    display the predetermined indication at the stained position again upon repeatedly detecting the stain at the stained position irrespective of the wiping operation applied to the stained position.

20. A non-transitory computer-readable storage medium having stored therein a program causing a processor to implement the display method according to claim 1.

* * * * *